United States Patent [19]

Bradbery et al.

[11] 3,828,314

[45] Aug. 6, 1974

[54] END MARK CONTROLLED SWITCHING SYSTEM AND MATRIX

[75] Inventors: Jack L. Bradbery, Evergreen Park; Todd G. Andersen, Lombard; William A. Fechalos, Dupage, all of Ill.

[73] Assignee: Wescom, Inc., Downers Grove, Ill.

[22] Filed: Jan. 25, 1972

[21] Appl. No.: 220,651

Related U.S. Application Data

[63] Continuation-in-part of Ser. No. 112,346, Feb. 3, 1971, abandoned.

[52] U.S. Cl. .......... 340/166 R, 179/18 GF, 307/248

[51] Int. Cl. .......... H04g 9/00, H04m 3/00

[58] Field of Search .......... 340/166 R; 179/18 GF; 307/248

[56] References Cited

UNITED STATES PATENTS

| | | | |
|---|---|---|---|
| 3,375,502 | 3/1966 | Shively | 340/166 R X |
| 3,392,373 | 7/1968 | Rouzier | 340/166 R |
| 3,456,084 | 7/1969 | Haselton, Jr. | 340/166 R |
| 3,531,773 | 9/1970 | Beebe | 340/166 R |
| 3,542,963 | 11/1970 | Aagaard | 179/18 GF |
| 3,546,394 | 12/1970 | Platt | 340/166 |
| 3,688,051 | 8/1972 | Aagaard | 340/166 R X |

*Primary Examiner*—Donald J. Yusko
*Attorney, Agent, or Firm*—Wolfe, Hubbard, Leydig, Voit & Osann, Ltd.

[57] ABSTRACT

Electronic switching systems employing three terminal, four layer PNPN-type thyristors having their gates brought out from the layer or region adjacent their anodes and characterized by having holding current levels that are high relative to their starting or turn-on current levels (the names which have been coined to identify one such thyristor are "Trigger Point Adjustable Diode" and "TAD" are controlled by end marking and are suitable for direct switching of analog signals. Single and multiple stage switching matrices with end marking control, such as may be used in telephony, for example, employ TAD thyristors as crosspoints and include gate control circuitry, so as to provide each of several inlets with selective access to each of several outlets by means of self-seeking path control, while ensuring that no more than one path at a time is established to or from any given inlet or outlet. Such matrices are capable of being packaged in either discrete component or integrated circuit form.

52 Claims, 13 Drawing Figures

INVENTORS.
JACK L. BRADBERY
TODD G. ANDERSEN
WILLIAM A. FECHALOS
BY Wolfe, Hubbard, Leydig, Voit & Osann
ATTORNEYS.

INVENTORS.
JACK L. BRADBERY
TODD G. ANDERSEN
WILLIAM A. FECHALOS
BY
Wolfe, Hubbard, Leydig, Voit & Osann
ATTORNEYS.

INVENTORS.
JACK L. BRADBERY
TODD G. ANDERSEN
WILLIAM A. FECHALOS
BY
Wolfe, Hubbard, Leydig, Voit & Osann
ATTORNEYS.

INVENTORS.
JACK L. BRADBERY
TODD G. ANDERSEN
WILLIAM A. FECHALOS
BY
Wolfe, Hubbard, Leydig, Voit & Osann
ATTORNEYS.

INVENTORS.
JACK L. BRADBERY
TODD G. ANDERSEN
WILLIAM A. FECHALOS
BY
Wolfe, Hubbard, Leydig, Voit & Osann
ATTORNEYS.

INVENTORS.
JACK L. BRADBERY
TODD G. ANDERSEN
WILLIAM A. FECHALOS
BY
Wolfe, Hubbard, Leydig, Voit & Osann
ATTORNEYS.

END MARK CONTROLLED SWITCHING SYSTEM AND MATRIX

CROSS REFERENCE TO RELATED APPLICATION

This application is a continuation-in-part of our copending application Ser. No. 112,346, filed Feb. 3, 1971, and entitled *End Mark Controlled Switching System and Matrix*, now abandoned.

BACKGROUND OF THE INVENTION

This invention relates to electronic switching systems with end marking control and, more particularly, to switching matrices for providing selective access between any one of a plurality of inlets and any one of a plurality of outlets in response to electrical end marking of the desired inlet and outlet.

As used herein, a switching system with "end marking control" is broadly defined as a system wherein a conductive path is provided between an inlet and an outlet in response to the application of predetermined control signals thereto and wherein the path is then sustained until the current therethrough drops below a predetermined holding current level. Thus, the control or end marking signals not only control the switching function, but also uniquely identify the desired inlet and outlet.

As compared to the alternative forms of control, the most significant advantages of end marking control are realized in connection with switching systems arranged in matrix configurations. Specifically, by virtue of the end marking control, such a matrix has self-seeking path control in that the X–Y coordinates for the path are identified by and the path is established in response to the end marking of the desired inlet and outlet of the matrix. Hence, external path control equipment, which is often quite complex and costly, is not required. Nevertheless, it will be understood that end marking control is applicable to switching systems in general.

Various switching systems with end marking control, including some in matrix configurations, have been proposed heretofore. However, they have met with only limited success due to various problems, including cost, restrictive limitations on speed of response, and a tendency for spurious or undesired paths to be established through the matrix at the same time and in response to the same end marking that causes the desired path to be established.

Moreover, it is notable that end marking control has only occasionally been adapted to electronic switching systems, even though such systems are inherently more compact and usually faster acting than the electromechanical alternatives. One of the primary reasons for this is believed to be that the general practice heretofore has been to employ twoterminal switching devices, such as Shockley or PNPN diodes, and to rely for triggering or firing purposes either on the sensitivity of such devices to the rate of change of their anode-cathode voltage, i.e., their rate sensitivity, or on their anode-cathode forward bias or reverse breakdown. However, when rate sensitive, or so-called "rate effect," switching is employed, it is difficult to accurately determine a switching threshold for the system, since it depends on the rate sensitivities of the switching devices per se. together with environmental factors, such as temperature and the values of the lumped and distributed capacitances associated in the system with the switching devices. Further, the problem of determining a switching threshold for such a system is frequently compounded by the variations in rate sensitivity from one switching device to another which are generally encountered, even if all of the switching devices are selected from the same manufacturing batch. Also, such systems are often highly sensitive to noise and the like. On the other hand, when the anode-cathode forward bias or reverse breakdown characteristics of the switching devices are relied on, it has been found that the critical characteristics commonly vary from device to device. Accordingly, prior art electronic switching systems with end marking control have had uncertain response characteristics which have led to the use of various compromises, such as random switching techniques. For example, one of the approaches that has been taken in multi-stage matrices has involved a so-called "race" technique such that when end marks are applied to an inlet and an outlet of the matrix all of the non-conductive switching devices or crosspoints, or at least all of them that are included within any of the available paths between the end marked inlet and outlet, tend to switch into conduction. There is then a "race," since as soon as one path is completed, all of the switching devices or crosspoints in alternative paths, at least hopefully, return to their non-conductive states.

SUMMARY OF THE INVENTION

Accordingly, a primary object of the present invention is to provide a new and improved electronic switching system with end marking control. A more detailed related object is to provide a switching system of the foregoing type which is capable of providing at least audio grade transmission of analog signals between an inlet and an outlet in response to end marking of the inlet and outlet. Another more detailed object is to provide a switching system of the foregoing type which has a positive and unambiguous response to the end marking of an inlet and outlet, regardless of the rate of change of the voltage between the inlet and outlet.

Another object of this invention is to provide an electronic switching matrix with end marking control and positive lockout of spurious or undesired paths. A more specific related object is to provide a switching matrix of the foregoing type wherein alternative paths to or from the end marked inlet and an end marked outlet are locked out or inhibited from at least the time the desired path between them is established. An even more specific object is to provide a switching matrix of the foregoing type wherein there is positive control at all times over the path or paths that are established and released. Another related object is to provide a switching matrix which has reliable and positive self-seeking path control.

A further object of the present invention is to provide an analog signal switching matrix which has semiconductor-type crosspoint devices which are controlled by end marking to selectively complete low impedance, analog transmission paths between electrically end marked inlets and outlets of the matrix. A related object is to provide a switching matrix of the foregoing type wherein the transmission paths are audio grade. A related object is to provide a switching matrix of the foregoing type wherein provision is made to ensure that the appropriate crosspoint is switched into conduction in response to the end marking of an inlet and an outlet, regardless of the rate of change of the voltage therebetween.

An even further object of the present invention is to provide a multistage switching matrix wherein the crosspoints that are common to an inlet of at least the first stage of the matrix are all momentarily switched into conduction in response to the end marking of the inlet, but wherein only the one of such crosspoints that is also connected by an available or non-busy path to an end marked outlet is provided with holding current to sustain it in conduction. A related object is to provide a multi-stage matrix of the foregoing type wherein there is positive path control such that there is no more than one conductive path extending to or from any inlet or outlet of the matrix for any applicable length of time. A more detailed related object is to provide positive path control for a multi-stage matrix of the foregoing type, even though the crosspoints in one or more of the stages of the matrix may be switched into conduction in response to the rate of change of their anode-cathode voltage, i.e., may exhibit "rate responsive firing".

Still another object of this invention is to provide a switching matrix of the foregoing type which may be packaged in either discrete component or integrated circuit form. Also, one of the more specific objects is to provide a switching matrix which can be manufactured so economically that fully non-blocking selective access between each inlet and each outlet of the matrix is practical, even in large scale applications, such as to telephone exchanges.

BRIEF DESCRIPTION OF THE DRAWINGS

Other objects and advantages of the present invention will become apparent when the following detailed description is read in conjunction with the attached drawings, in which.

Figure 1:
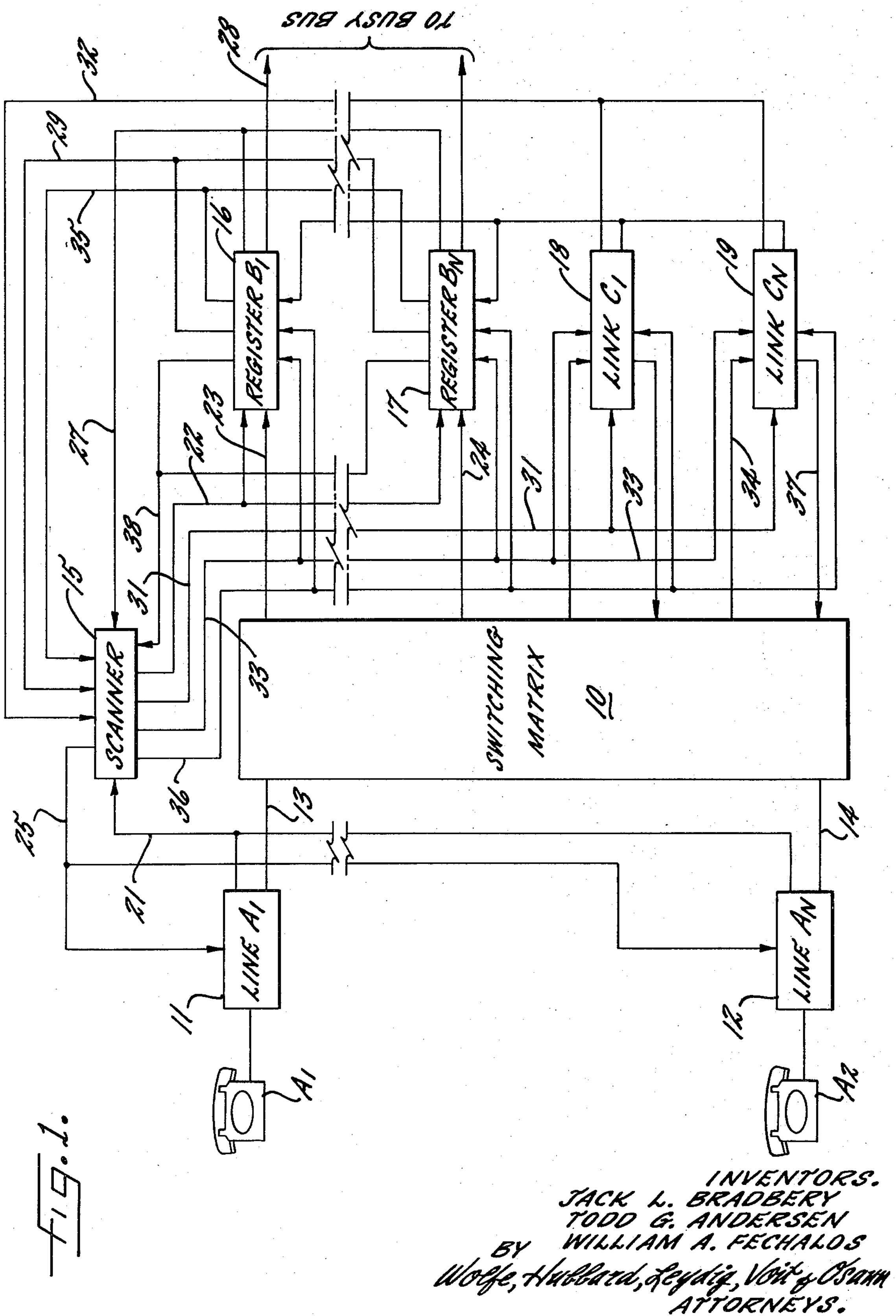
FIG. 1 is a fragmentary and simplified block diagram of a private automatic telephone exchange (PAX), and is representative of one of the many applications for the switching system of the present invention in its matrix configuration.

While the invention is described in detail hereinafter in connection with certain illustrated embodiments, it is to be understood that the intent is not to limit it to those embodiments. To the contrary, the intent is to cover all modifications, alternatives and equivalents falling within the spirit and scope of the invention as defined by the appended claims.

Appropos of the foregoing, one of the important aspects of the present invention is the discovery that a three terminal, four layer PNPN-type thyristor having its gate brought out from the layer or region adjacent its anode and characterized by having a holding current level which is high relative to its starting or turn-on current level (e.g., a so-called "Trigger Point Adjustable Diode" or "TAD" thyristor) has special advantages over the switching devices previously employed in electronic switching systems with end marking control. For a more detailed description of such a thyristor, reference may be had to Andersen U.S. Pat. No. 3,725,683, which is assigned to the assigner of the instant application.

For present purposes, it suffices to note that the TAD thyristor switches into conduction whenever (1) its anode-gate junction is forward biased and (2) a current equal to or exceeding a predetermined turn-on or starting current level is drawn through its anode-cathode circuit. Thereafter, the thyristor latches in conduction only if its anode-cathode current is at least equal to a predetermined holding current level. The holding current necessary to maintain such a thyristor latched in its conductive state exceeds the current required to initiate conduction typicly as much as one hundred or more microamperes. This unusually large differential between the anode-cathode current required for turn-on and the anode-cathode current required for latching permits such a thyristor to be readily and positively switched from one state of conduction to the other. Further, as applied to switching systems with end marking control, this characteristic affords increased control since it permits the thyristor to be momentarily switched into conduction without necessarily latching in conduction.

Also, the TAD thyristor has the unique advantage over the switching devices previously proposed for electronic switching systems with end marking control of being adaptable to biasing which may be selected to promote or prevent the thyristor from switching to its conductive state in response to the rate of change of its anode-cathode voltage. As of this time, there has not been sufficient a.c. analysis of the so-called TAD thyristor to permit any definite conclusions to be reached as to the precise mechanism involved in determining the rate sensitivity. It is, however, known that the tendency for such a thyristor to exhibit rate sensitive or rate effect switching increases as a direct function of the value of any bias resistance generally included between its gate and a positive bias supply and as an inverse function of the value of any resistance in series with its anode and of the amount of any back bias applied under quiescent conditions to its anode-gate junction. Consequently, any or all of those parameters can be adjusted as desired to promote or prevent rate sensitive switching of such a thyristor. Of course, in those situations wherein rate sensitive switching is prevented, the thyristor can still be switched into conduction by applying an external voltage to forward bias its anode-gate junction.

As a further unique advantage of the so-called TAD thyristor for electronic switching systems with end marking control, it is noteworthy that it is adaptable to direct switching of analog signals. Indeed, when such a thyristor is in conduction, its anode-cathode circuit has an audio grade transmission characteristic over a substantial band of frequencies. For example, the thyristor disclosed and claimed in the aforementioned application Ser. No. 112,345 is capable of at least audio grade direct switching of analog signals within at least the voice or speech band of frequencies.

Thus, it is to be understood that this invention is applicable to switching systems in general, even though the primary emphasis is hereinafter focused on switching matrices in order to bring out certain of the more detailed aspects of the invention.

With that in mind, attention is directed to FIG. 1 wherein a switching matrix 10 embodying the present invention is illustrated for exemplary purposes as being included in a private automatic telephone exchange (PAX) for providing selective intercom-type communication between a number of parties via their respective telephones $A_1$–$A_N$. The details of the exchange are for the most part only incidental to the instant invention and it has, therefore, been shown in greatly simplified form. However, a general understanding of the manner in which a call is completed will aid in understanding the significance of certain of the features of the invention.

More particularly, it will be seen that the telephones $A_1$–$A_N$ are coupled to the switching matrix 10 by respective line circuits 11 and 12 and leads 13 and 14 so that each telephone has selective access to each of the other telephones via the matrix 10 under the control of a scanner 15, a selected one of the registers 16 and 17, and a selected one of the links 18 and 19. Of course, the number of registers and links included within the exchange depends on the traffic the exchange is intended to handle.

The scanner 15 is coupled by a lead 21 to sequentially scan the line circuits 11 and 12 at a predetermined frequency to detect requests for service, i.e., an off-hook condition of any of the telephones $A_1$–$A_N$. Further, the scanner 15 is coupled by a lead 22 to sequentially scan the registers 16 and 17 at another predetermined frequency to thereby cause the registers 16 and 17 to sequentially end mark their respective leads 23 and 24 from the matrix 10 with an appropriate signal. Accordingly, service is avaiable to the telephones $A_1$–$A_N$ during successive line scan time slots, and one or the other of the registers 16 and 17 is on line to process any calls that may be initiated. Typically, the register scan frequency is selected so that the call processing function passes from one register 16, 17 to the next at a rate substantially equal to the line scan frequency.

Now, say the telephone $A_1$ goes off hook while the register 16 is on line to end mark the lead 23 from the matrix 10. Under those conditions, the scanner 15 sequentially scans or interrogates the line circuits for requests for service until it reaches the line circuit 11. The scanner then senses the request for service from the telephone $A_1$ and in response thereto sends a command back to the line circuit 11 through a lead 25 and causes the line circuit 11 to end mark its matrix lead 13. At the same time, the scanner 15 expands the time slot for the line circuit 11 and it, therefore, remains in that time slot for a period sufficient to enable a path to be completed between the end marked leads 13 and 23 of the matrix 10. As soon as the path is completed, the time slot of the line circuit 11 is stored in the register 16 for later identification of the calling or originating party and the scanner 15 is then released to resume the interrogation of the line circuits for other requests for service. The register 16, on the other hand, is triggered to provide a dial tone which indicates that it is ready to process the call, and the originating party then dials the called or terminating party's number, say the number of the telephone $A_N$.

After the register 16 has stored the terminating party's number, it sends a signal through a lead 27 which causes the scanner 15 to stop scanning the lines $A_1$–$A_N$ for further requests for service. The register 16 then reads out the called party's number via a lead 28 into a busy bus (not shown) to determine whether the called party's line 14 is busy or not. If the busy check is negative, the register next sends a link select signal through a lead 29 which actuates the scanner 15 to sequentially scan the links 18 and 19 at a predetermined frequency with signals passed to them through a lead 31. The scanner 15 scans the finder and connector sides of the links in alternate, or odd and even numbered, time slots such that the finder side of a given link is scanned during one time slot and the connector side of the same link is scanned during the next time slot. Moreover, in response to the aforementioned or first link select signal, the scanner 15 steps from one link 18, 19 to the next until it reaches a link, say the link 19, which is free or idle.

The idle link 19 then sends an idle link signal back to the scanner 15 via a lead 32 which causes the scanner 15 to expand the time slot for the finder side of the link 19 and which also causes the scanner to provide a finder allot signal on a lead 33. The finder allot signal is, in turn, applied to the idle link 19 to cause it to appropriately end mark its finder side matrix lead 34. Further, the finder allot signal is applied to the register 16 to command a read out of the originating or calling party's time slot identification on to a lead 35. The scanner 15 then decodes the time slot information from the register 16 so that an end mark command for the originating party's line circuit 11 appears on the lead 25. Thus, the matrix leads 13 and 34 are then both appropriately end marked and a path is, therefore, completed through the switching matrix 10 between the originating party's telephone $A_1$ and the finder side of the selected line 19.

Thereafter, the scanner 15 advances to its next link scan time slot, i.e., the time slot for the connector side of the link 19. If at that time the finer side of the link 19 is busy while its connector is idle, another or second idle link signal appears on the lead 32 which causes the scanner to expand the time slot for the connector side of the link 19 and which also causes the scanner to provide a connector allot signal on a lead 36. The connector allot signal is, in turn, applied to the link 19 to cause it to end mark its connector side matrix lead 37 and to the register 16 to command it to read out the called or terminating party's number on to a lead 38. The called party's number is next decoded by the scanner 15 so that a command is produced on the lead 25 which causes the terminating party's line circuit 12 to end mark its matrix lead 14. Consequently, the matrix leads 14 and 37 are then appropriately end marked and another path is, therefore, completed through the matrix 10 between the terminating party's telephone $A_N$ and the connector side of the selected link 19. The last mentioned path, of course, completes the circuit between the originating and terminating party's telephones $A_1$ and $A_N$. Accordingly, the link 19 then produces a call complete signal on a lead 41 to reset the register 16 which, in turn, causes the scanner 15 to resume scanning the line circuits for additional requests for service.

The exemplary environment illustrates that the matrix 10 does not require external path control equipment. Instead, in the exemplary PAX, to find and establish the various paths through the matrix 10 that are required to complete a call, advantage is taken of the self-seeking path control and the protection against spurious paths that are provided in accordance with the present invention. Also, it will be seen that the analog signals (say, speech signals) and end marking signals are applied to the same leads of the matrix 10 so as to take advantage of the high fidelity, analog signal switching capabilities of the matrix. Thus, in many applications of the switching matrix 10 there is no need to follow the previously existing practice of using the matrix simply to control separate switching devices, such as reed relays or the like, by which the analog signals are carried. Indeed, with the separate switching devices eliminated, the matrix 10 can be packaged in integrated circuit form and manufactured relatively inexpensively so as to make it economically feasible to design it to be fully non-blocking. As is known, fully non-blocking switching matrices for large scale applications, such as to telephone exchanges, have been almost unheard of heretofore.

Figure 2:
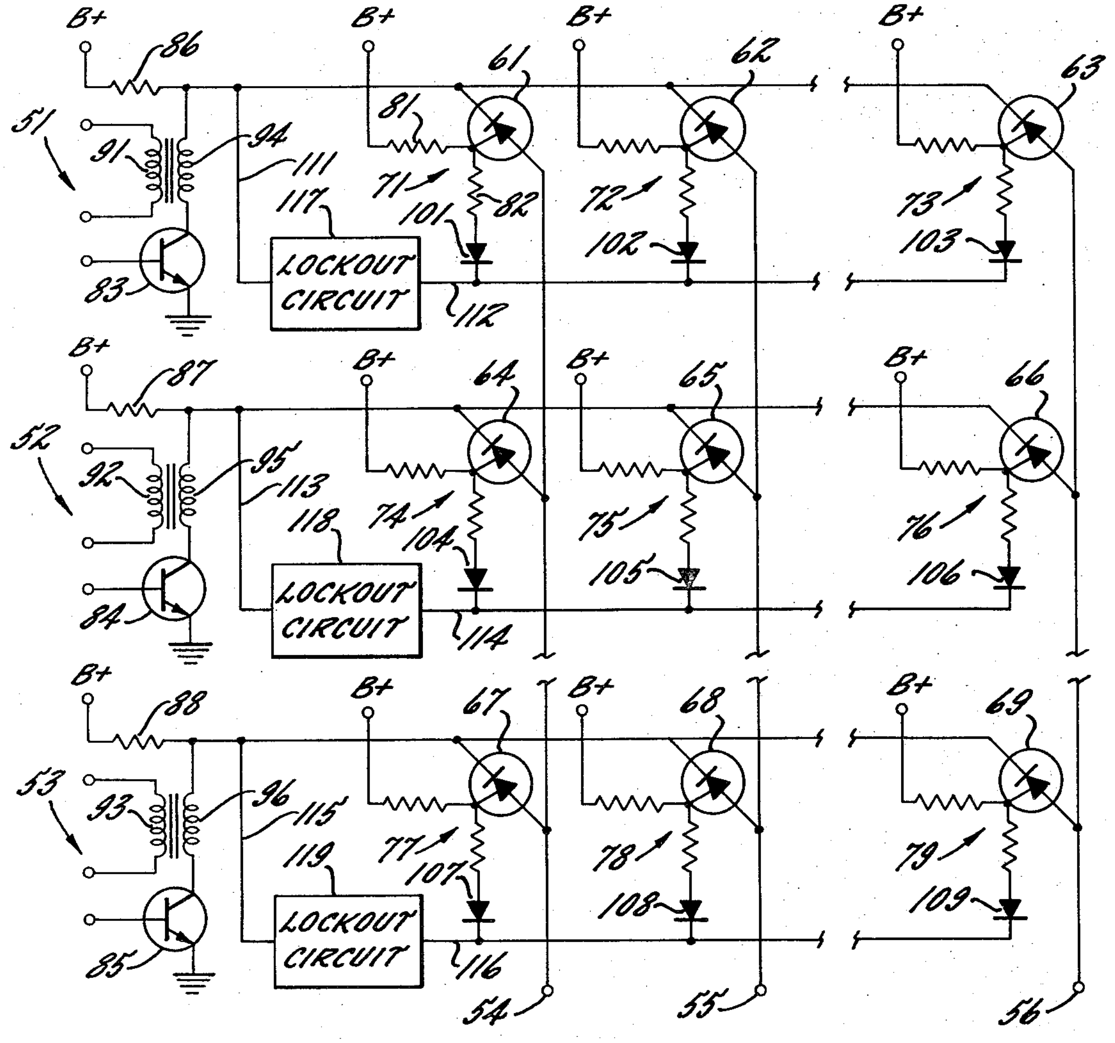
FIG. 2 is a fragmentary illustration, partly in block diagram and partly in schematic form, of an exemplary single stage switching matrix incorporating the present invention.
Figure 4:
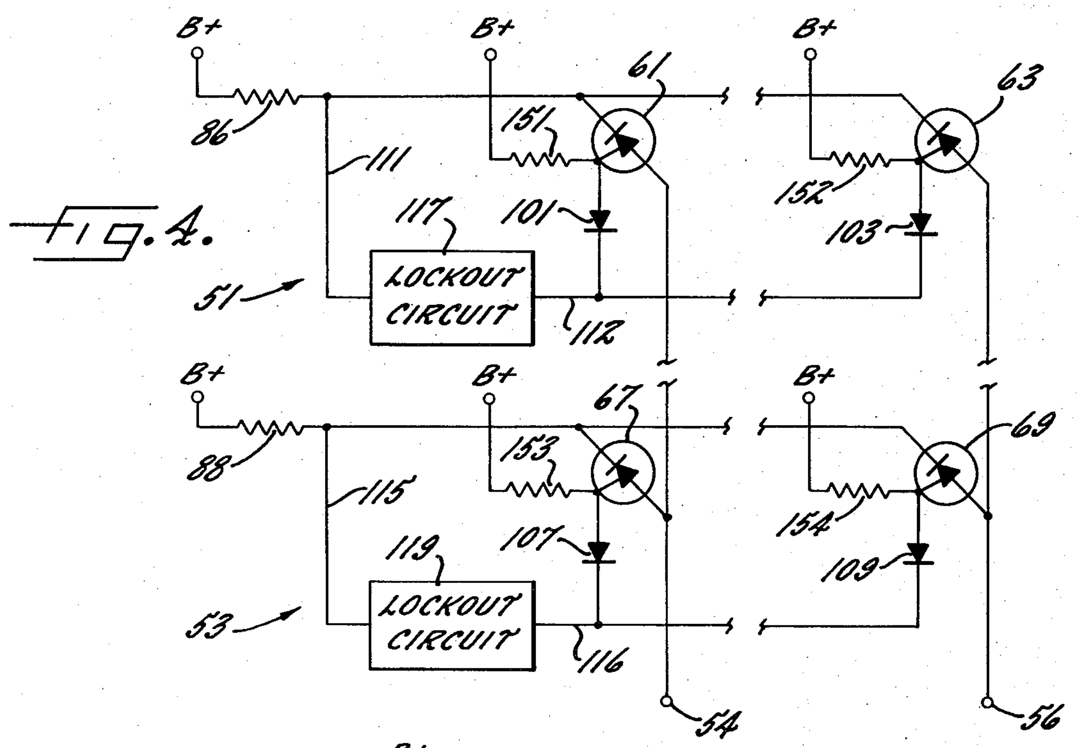
FIG. 4 is another fragmentary illustration, partly in block diagram and partly in schematic form, of a modified single stage switching matrix incorporating the present invention.
Figure 7:
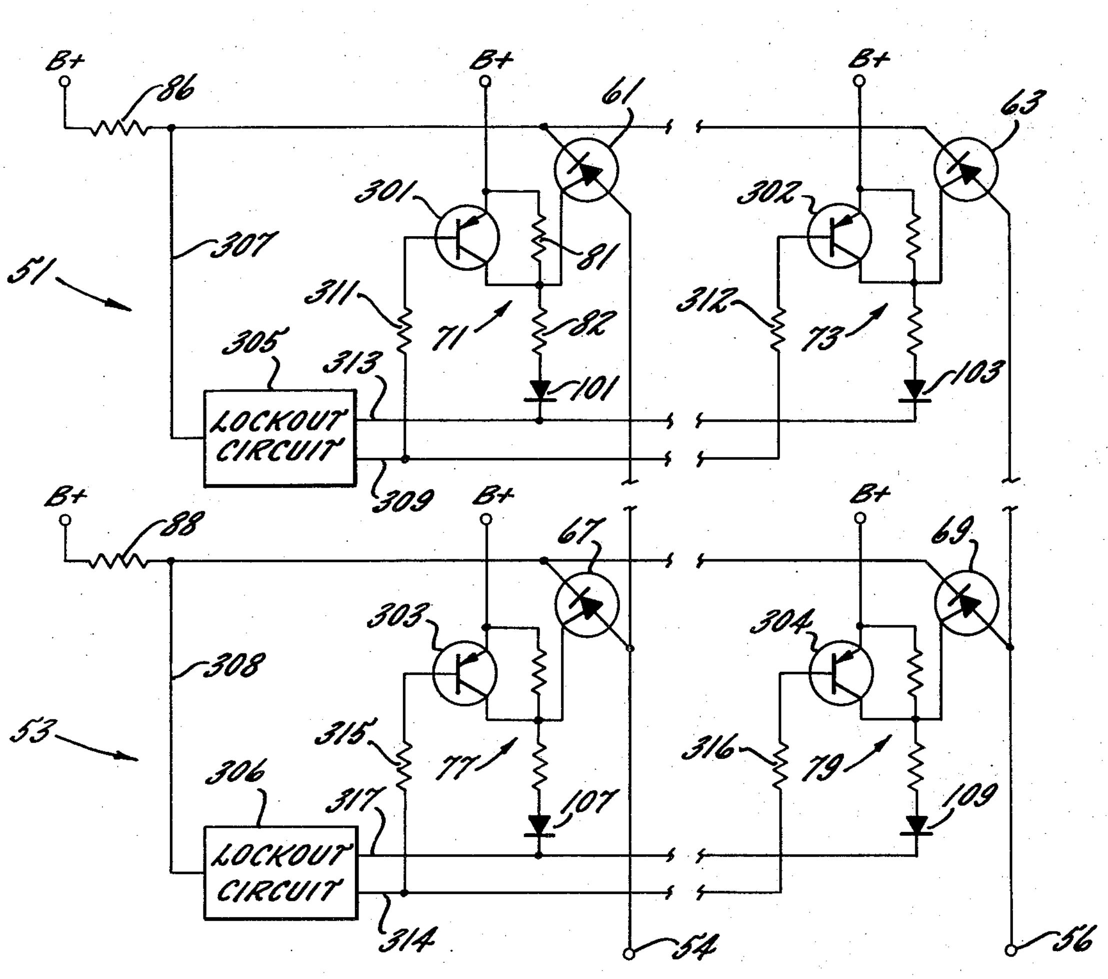
FIG. 7 illustrates, partly in block diagram and partly in schematic form, still another modified single stage switching matrix incorporating the present invention.

As shown in FIGS. 2, 4 and 7, switching matrices embodying the present invention have so-called TAD thyristors as crosspoints which are switched into and out of conduction in response to the application and removal of end marking signals to and from their anodes and cathodes. There are various combinations of end marking signals and gate bias levels that can be used to ensure that a TAD crosspoint switches into conduction when its anode and cathode are both end marked and thereafter remains in conduction until either its anode or cathode end mark is removed. For exemplary purposes, however, it is noted that acceptable end marking control has been achieved by using an anode end marking signal of approximately 13 volts d.c. and a cathode end marking signal in the form of a low impedance path to ground, an inhibiting gate bias voltage level of approximately 15 volts d.c., and an enabling gate bias voltage level of approximately 11 volts d.c. It has been found that a forward bias of about two volts on the anode-gate junction of a TAD crosspoint having its anode and cathode end marked is ample to cause turn-on current to be drawn through the anode-cathode circuit of the crosspoint, regardless of the rate of change of its anode-cathode voltage. Moreover, no difficulties have been encountered in satisfying the turn-on or holding current requirements of the TAD crosspoint as a result of permitting the low impedance path that is used for cathode end marking purposes to include as much as a few hundred ohms of impedance.

More particularly, turning first to the matrix shown in FIG. 2, each of the several inlets 51–53 thereof is provided with selective access to each of the several outlets 54–56 therefrom via the anode-cathode circuits of respective TAD crosspoints 61–69. In other words the TAD crosspoints 61–69 are connected to form rows which extend from the respective inlets 51–53 and columns which extend to the respective outlets 54–56, such that any one of the outlets is accessible from any one of the inlets by firing the crosspoint that has its anode-cathode circuit connected to define the junction between the particular inlet and outlet. As will be appreciated, with the TAD crosspoints 61–69 poled as shown, the rows for the inlets 51–53 respectively comprise the interconnected or common cathodes of the crosspoints 61–63, 64–66, and 67–69, whereas the columns for the outlets 54–56 respectively comprise the common anodes of the crosspoints 61, 64 and 67, 62, 65 and 68, and 63, 66 and 69. Of course, while only square matrices have been illustrated (a three-by-three matrix in FIG. 2, and two-by-two matrices in FIGS. 4 and 7), it will be understood that matrices constructed in accordance with the present invention may have any number of rows and columns and may have a variety of geometries, including square, rectangular and triangular. Indeed, the illustrated matrices have been shown in fragmentary form to indicate that additional rows and/or columns may be added as desired. Likewise, it will be understood that the single stage matrices embodying the present invention may be included as substages in a variety of different types of multi-stage matrices.

The gates of the TAD crosspoints 61-69 are biased by positive voltages which, in the case of the matrix shown in FIG. 2, are picked off the midpoints of respective voltage dividers 71–79 which, in turn, may respectively comprise a pair of resistors 81 and 82 connected in series across an appropriate bias supply source. To accommodate the inhibiting function of the subsequently discussed gate control circuitry, the bias supply source is selected to have an output voltage which is at least just about equal to the voltage of the signals used for anode end marking purposes. Indeed, to ensure that the crosspoints which are to be inhibited have their anode-gate junctions reliably back biased, the output voltage of the bias supply source preferably exceeds the voltage of the anode end marking signals by a few volts.

In view of the manner in which the TAD crosspoints 61–69 are poled in the illustrated embodiment, the cathode end marking signals are applied to the rows or inlets 51–53 of the matrix and the anode end marking signals are applied to the columns or outlets 54–56. Various different methods and means for accomplishing the end marking will be apparent. For example, the absolute path control such as when information appearing at a given inlet must be transferred to a predetermined outlet, provision may be made to apply the end marking signals to the specific inlet and outlet so as to cause the crosspoint between them to fire or switch into conduction. In many situations, however, absolute path control is neither necessary nor desirable. For instance, several or all of the outlets may be equally suitable for routing information appearing at a given inlet, such as when the outlets are connected to alternative means for processing the information or to alternative means for transferring the information to its final destination. In that event, the alternatively suitable outlets may be sequentially end marked by a scanner or the like, and the cathode end marking signal may then be relied on to control the time at which a path is completed from the given inlet to one of the alternative outlets. At any rate, however, at least when the TAD-type thyristors are employed as the crosspoints and combined with gate control circuitry such as subsequently discussed, the anode of the crosspoint which is to be fired should be end marked no later than its cathode, since otherwise the crosspoint may be inhibited from switching into conduction by the control circuitry.

As will be appreciated, regardless of the degree of path control required, conventional pulse generating equipment is usually suitable for supplying the anode or outlet end marking signals. Thus, instead of extending this disclosure by including a detailed description of exemplary pulse generating means, it suffices to note that the pulse generating means preferably has at least a moderate degree of current regulation in order to reliably satisfy the holding current requirements of the crosspoint or crosspoints that may be in conduction. There are, however, a few minor considerations involved with the cathode or inlet end marking which are worthy of special mention.

Specifically, in the illustrated embodiment, to control the end marking of the cathodes of the TAD crosspoints 61–69, the matrix inlets 51–53 respectively comprise transistors 83–85 which have their collectors connected by respective voltage dropping resistors 86–88 to a suitable supply source and their emitters returned to ground. The cathodes of the TAD crosspoints 61–63, 64–66 and 67–69 comprised by the respective rows of the matrix are, in turn, respectively connected to points between the voltage dropping resistors 86–88 and the collectors of the transistors 83–85. Accordingly, it will be seen that the collector-emitter circuits of the transistors 83–85 provide return paths to ground for the cathodes of the crosspoints in the respective rows of the matrix and, in large measure, define the impedances of such paths. Hence, cathode or inlet end marking signals are applied to and removed from the TAD crosspoints 61–63, 64–66 and 67–69 as the transistors 83–85 are respectively switched into and out of conduction, such as in response to switching signals applied to their bases (by means not shown).

As previously mentioned, one of the features of the present invention is that the TAD crosspoints are suitable for direct switching of analog signals and can effect such switching with little, if any, degradation of the analog signals, at least when such signals fall into the voice band normally occupied by the speech signals encountered in telephony. For that reason, in the illustrated embodiment, the inlets 51–53 are shown as further including respective transformers which have their primary windings 91–93 coupled to respective analog signal sources (e.g., the telephones $A_1$–$A_N$ shown in FIG. 1) and their secondary windings 94–96 respectively connected in series with and returned to ground through the collector-emitter circuits of the transistors 83–85. Hence, the analog signals, which are commonly bipolar, i.e., swing positively and negatively relative to a zero or ground reference level, developed across the secondary windings 94–96 are superimposed on any d.c. current flowing through the collector-emitter circuits of the transistors 83–85, including the holding current for any conductive crosspoint. Consequently, as one of the special considerations involved in cathode end marking, it is noted that for direct switching of bipolar analog signals provision is required to ensure that the normal swings of the analog signals do not cause the d.c. currents that are drawn through the anode-cathode circuits of the conductive crosspoints to drop below the level of the required holding current. Otherwise there is danger that the conductive crosspoints will prematurely revert to their non-conductive states. To that end, for bipolar analog signal switching purposes, in the illustrated embodiment the values of the resistors 86–88 are selected to cause any of the transistors 83–85 that is in a conductive state to draw a d.c. collector-emitter current equal to the TAD holding current plus at least twice the peak swing of the analog signal superimposed thereon.

Alternatively, of course, the matrix of this invention may be employed to advantage for indirect switching of analog signals. For instance, the matrix may be used to control the energization and de-energization of relays (not shown) which, in turn, control respective sets of contacts (also not shown) to make and break separate transmission paths for the analog signals. Accordingly, when it is intended to limit a statement made herein to direct switching of analog information, specific reference will be made thereto or it will be noted that the analog information is carried by the anode-cathode circuits of the TADs.

Also, it will be understood that the matrix of the present invention may be used for direct or indirect switching of digital information. Indeed, insofar as direct switching of digital information is concerned, it is noted that digital information can usually tolerate lower grade transmission characteristics than analog information. Hence, to encompass both analog and digital information, reference is sometimes made herein to "information bearing signals."

In accordance with another feature of this invention, provision is made to guard against the mixing or loss of any of the information appearing at the several inlets of the matrix. Specifically, means are provided to inhibit the spurious or undesired paths that might otherwise be established through the matrix. The general rule in this regard is that it is preferable that there be no more than one conductive path at a time to or from any of the inlets 51–53 or outlets 54–56, although an exception is noted in connection with the subsequent discussion of multi-stage matrices whereby in some instances it is permissible to have multiple paths from a matrix inlet for a brief period following the application of an end marking signal thereto. As will be appreciated, this feature of the invention is applicable regardless of whether the matrix is employed for direct switching of information bearing signals or not.

In carrying out this aspect of the invention, advantage is taken of a characteristic of the TAD thyristor whereby voltage developed across its anode-cathode circuit drops to a low level of about one volt or so when the thyristor is switched into conduction. In the illustrated embodiment, wherein the columns of the matrix comprise the common anodes of the TAD crosspoints, the aforementioned characteristic is relied on to protect against a plurality of inlets being given simultaneous access to the same outlet. That is, when a crosspoint in any of the columns switches into conduction to provide one of the inlets with access to the outlet from the particular column, the other crosspoints in the same column are inhibited since their anodes are clamped by the conductive crosspoint to a voltage which is so low that the anode-gate junctions of the other crosspoint are held in a back biased condition, regardless of whether the voltages applied to their gates are at the inhibiting or enabling level.

On the other hand, to guard against one of the inlets 51–53 being given simultaneous access to a plurality of the outlets 54–56, the lower legs of the voltage dividers 71–79 are connected in series with respective diodes 101–109, and there are respective gate control circuits 117–119 provided for the several rows of the matrix. The gate control circuits 117–119 respectively respond to the end marking of the inlets 51–53 to control the bias voltages applied to the gates of the TAD crosspoints 61–63, 64–66 and 67–69. To that end, the control circuits 117–119 are respectively connected by leads 111–112, 113–114 and 115–116 between the inlets 51–53 and the diodes 101–103, 104–106 and 107–109. The diodes 101–109 are, in turn, poled to permit current flow from the bias supply source through the respective control circuits 117–119, but not from the gate of one crosspoint to the gate of another. Accordingly, the diodes 101–109 act as blocking diodes so that part of the crosspoints 61–69 may be inhibited, even though the gate-cathode voltage of a conductive cross-point is extremely low, i.e., substantially zero.

More particularly focusing on the gate control circuit 117 as an example of a basic control circuit for the present invention, it will be seen that it not only ensures that any of the TAD crosspoints 61–63 that have their anodes appropriately end marked at the time switch into conduction in response to the end marking of the inlet 51 regardless of whether they exhibit rate effect switching or not, but also ensures that those of the crosspoints 61–63 that do not switch into conduction promptly upon the application of an end mark to the inlet 51 are subsequently inhibited or locked out. To that end, the gate control circuit 117 initially maintains the bias voltages for the gates of the crosspoints 61–63 at a relatively low, enabling level. When, however, an end mark at the inlet 51 is sensed by the gate control circuit 117, a brief switching period starts to run. The switching period is long relative to the normal turn-on time for the TAD crosspoints, which is typically on the order of about 100 NANOSECONDS, so that the appropriate crosspoints switch into conduction regardless of whether the rate of change of their anode-cathode voltages are high enough to cause rate sensitive switching or not. However, once the switching period expires, the bias voltages applied to the gates of the crosspoints 61–63 that have remained in the non-conductive states are increased by the control circuit 117 to a relatively high or inhibiting level such that those crosspoints are then prevented from being switched into conduction, even should their anodes later be appropriately end marked, so long as an end mark remains on the inlet 51. In a like manner, should any of the TAD crosspoints 61–63 only momentarily switch into conduction in response to the end marking of the inlet 51, the control circuit 117 is effective to inhibit them after they revert to their non-conductive states.

Figure 3:
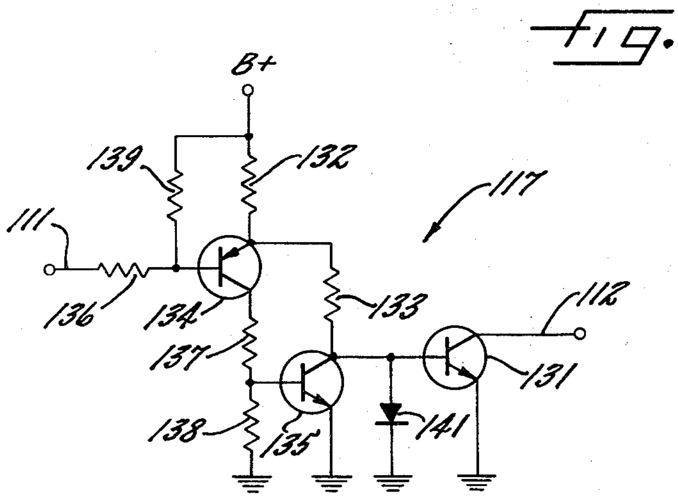
FIG. 3 is a schematic diagram of a basic gate control circuit such as may be used with a matrix constructed in accordance with this invention.

Referring additionally to FIG. 3, to carry out the foregoing the exemplary gate control circuit 117 suitably includes a transistor 131 which has its collector coupled by the lead 112 to the cathodes of the diodes 101–103 and its emitter returned to ground. Base-emitter drive current for the transistor 131 is supplied by a pair of resistors 132 and 133 under the control of a pair of transistors 134 and 135, such that the transistor 131 is switched from a conductive state to a non-conductive state in response to but with a slight delay following the application of an end marking signal to the inlet 51. To that end, the transistor 134 has its base coupled to the inlet 51 through a current limiting resistor 136 and the lead 111, its emitter coupled to a suitable supply source through the resistor 132, and its collector returned to ground through a pair of resistors 137 and 138. The transistor 135, on the other hand, has its collector coupled to the supply source by the resistors 132 and 133, its base coupled to a junction between the resistors 137 and 138, and its emitter returned to ground.

In the absence of an end marking signal at the inlet 51, there is a relatively high voltage developed across the inlet which tends to back bias the base-emitter junction of the transistor 134. The back bias may be augmented by connecting a resistor 139 between the bias supply source and the base of the transistor 134. Further, to prevent the leakage currents that may be present from affecting the operation of the circuit, a drain path for them may be provided by connecting a resistor 138 across the base-emitter junction of the transistor 135. Thus, it will be seen that in the absence of an end mark at the inlet 51, the transistor 134 is held in a non-conductive state to, in turn, hold the transistor 135 in a non-conductive state. Under those conditions, the transistor 131 is driven into conduction by current drawn through the resistors 132 and 133 and its collector-emitter circuit, therefore, provides a path for current flow through the voltage dividers 71–73. Accordingly, the voltage dividers 71–73 are effective to set the bias voltages applied to the gates of the crosspoints 61–63 at relatively low levels, thereby enabling the crosspoints to be switched into conduction by appropriate end marking. Preferably, to minimize the effects of ordinary ambient temperature variations, provision is made to temperature compensate the transistor 131, such as by shunting its base-emitter junction with a temperature compensating diode 141.

On the other hand, when the inlet 51 is end marked, it provides a low impedance path to ground, which causes the voltage at the base of the transistor 134 to drop. The base-emitter junction of the transistor 134 is then forward biased and current is drawn from the resistor 132 through the resistor 136. Hence, after a short delay, during which its base-emitter junction capacitance is charged, the transistor 134 is switched into conduction and drive current for the transistor 135 is then drawn through the resistor 137. Accordingly, after another short delay during which its base-emitter junction capacitance is charged, transistor 135 is switched into conduction. The collector-emitter circuit of the transistor 135 then provides a low impedance path to ground directly across the base-emitter junction of the transistor 131. Consequently, the current drawn through the resistor 133 is diverted through the collector-emitter circuit of the transistor 135, thereby causing the transistor 131 to switch to its non-conductive state.

The cumulative effect of the dealyed responses of the transistors 134 and 135 to the end marking of the inlet 51 provides a brief period during which any of TAD crosspoints 61–63 that has its anode appropriately end marked is switched into conduction. After that period has elapsed, however, the transistor 131 is in its non-conductive state and there is, therefore, no path for current flow through the voltage dividers 71–73. Consequently, the bias voltages applied to the gates of the crosspoints 61–63 that have not fired or switched into conduction are increased to substantially the level of the output voltage of the bias supply source which, as previously mentioned, is selected to be sufficiently high to inhibit the unfired crosspoints.

As will be appreciated, while the basic gate control circuit 117 is generally adequate for practical applications of a matrix embodying the present invention, there are certain situations in which its operation may, at least theoretically, depart from the ideal. For example, the control circuit 117 provides only a minor degree of protection against false firing of the TAD crosspoints in response to the noise voltages that may be present, particularly since it does not inhibit the crosspoints in the absence of a cathode or inlet end marking signal. Further, it has a relatively low input impedance and, therefore, tends to significantly load the matrix. Also, when the end mark is removed from the inlet 51, the transistor 131 is switched back into conduction, thereby causing a sharp pulse-like drop in the bias voltages that are applied to the gates of the unfired crosspoints. On occasion, this drop has been found to cause false firing of one or more of the crosspoints. Moreover, the gate control circuit 117 is not well suited to multi-stage matrices due to a tendency for the gate circuits in subsequent stages to provide holding current for the TAD crosspoints in preceding stages.

However, there are other gate control circuits that may be used to overcome these problems in whole or part. Indeed, various modifications to the control circuitry, as well as to the matrix itself, may be made without departing from the present invention.

For example, referring to FIG. 4, the matrix may be simplified by employing respective voltage dropping resistors 151–154, rather than respective voltage dividers, in the gate biasing circuits for the TAD crosspoints. In that way, a saving of one resistor per TAD or crosspoint is realized, which may be of substantial significance, especially from the standpoint of the space that is required to package a larger matrix embodying numerous crosspoints in integrated circuit form. Of course, the voltage dropping resistors 151–154 cooperate with the previously discussed lockout circuitry in substantially the same manner as the voltage dividers of FIG. 2, i.e., they drop a portion of the output voltage of the bias supply source only when current is drawn through them. It is noted, however, that when voltage dropping resistors or the like are used in place of voltage dividers, provision should be made in the gate control circuitry to maintain at least a mimimum bias voltage on the gates of the enabled crosspoints so as to protect them against excessive anode-gate voltage drops. For instance, to accommodate the basic gate control circuit 117 of FIG. 3 to the matrix of FIG. 4, a voltage dropping resistor (not shown) should be connected in series with the collector of the transistor 131.

Figure 5:
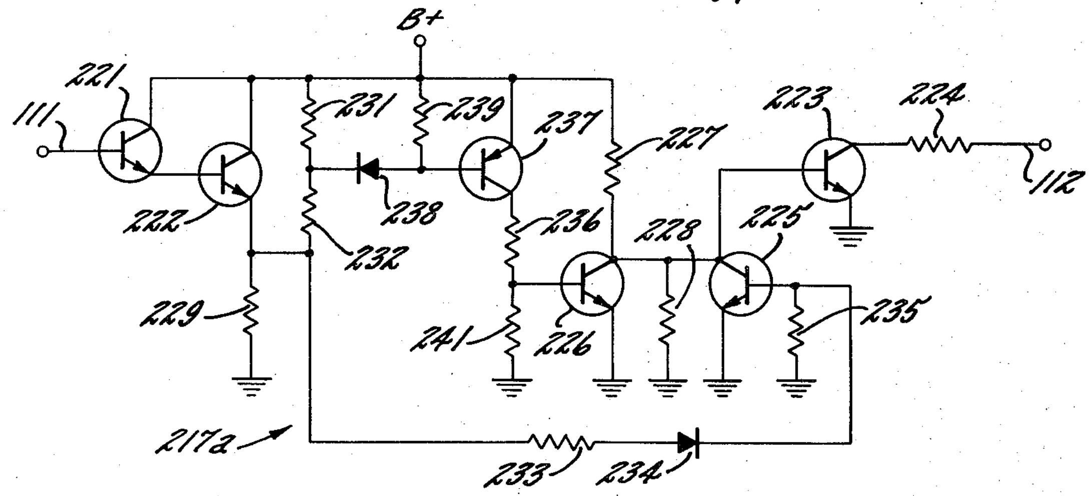
FIG. 5 is a schematic diagram of an improved gate control circuit for a matrix embodying the present invention.
Figure 6:
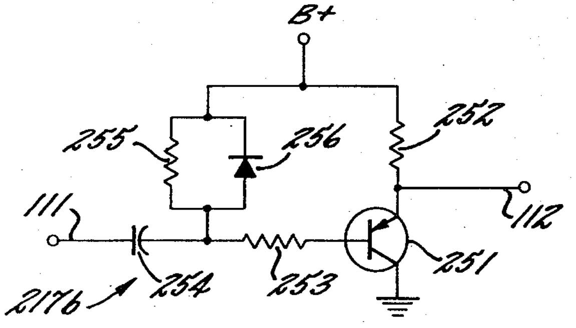
FIG. 6 is a schematic diagram of an alternative gate control circuit which provides substantially the same degree of control as is afforded by the control circuit shown in FIG. 5.
Figure 13:
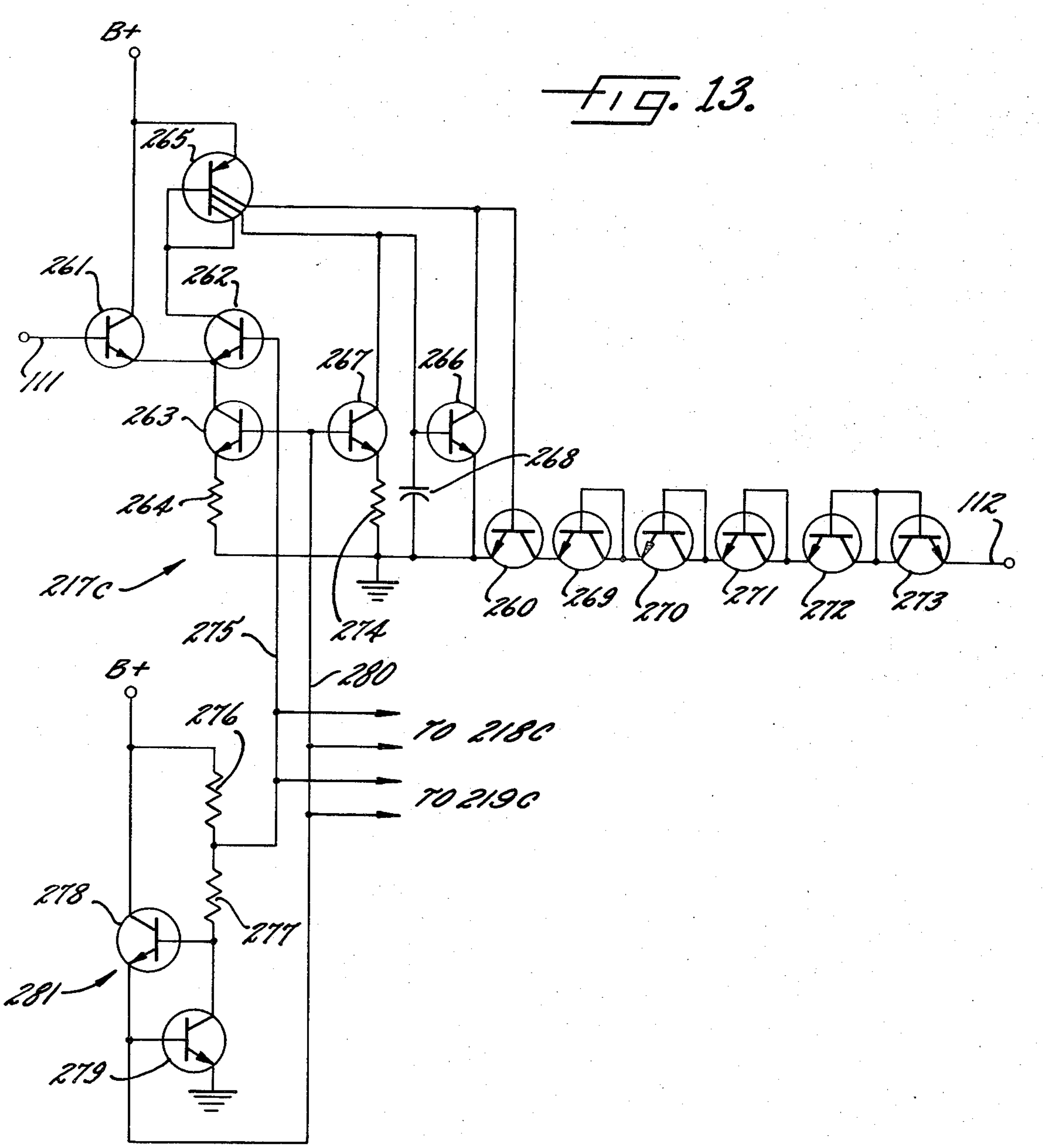
FIG. 13 is a schematic diagram of another control circuit that can be used as an alternative to the circuits of FIGS. 5 and 6.

Likewise, as illustrated by the alternative gate control circuits indicated generally by **217*a*, 217*b*, and 217*c* in FIGS. 5, 6 and 13, respectively, a modification of the control circuitry involves the provision of means to maintain the bias voltages applied to the gate of the TAD crosspoint at a sufficiently high level to inhibit the crosspoints from switching into conduction at all times, except for a brief period following the end marking of their cathodes. As compared to the basic control circuit 117 shown in FIG. 3, the control circuits 217*a*, 217*b*, and 217*c* all have the advantage of providing an increased measure of protection against false firing of the crosspoints in response to noise voltages or the like. They also impose less loading on the matrix, with the difference in this regard being more noticeable in connection with the control circuits 217*a* and 217*c* than with the control circuit 217*b***.

More particularly, as shown in FIG. 5, the control circuit **217*a* comprises a pair of transistors 221 and 222 which will be recognized as being connected in what is conventionally referred to as a Darlington pair, emitter follower configuration. The inlet 51 is connected by the lead 111 to the base of the first or input transistor 221 of the Darlington pair and, therefore, the loading effect of the lockout circuit 217*a* on the matrix is reduced to a negligible level by the characteristically extremely high input impedance of the Darlington pair. Furthermore, there is a transistor 223 which has its collector connected by a voltage dropping resistor 224 to the diodes 101 and 102 in the respective gate biasing circuits for the TAD crosspoints 61 and 63 and its emitter returned to ground. Thus, it will be seen that when the transistor 223 is in its non-conductive state, the crosspoints are inhibited since their gate bias voltages are held at substantially the level of the output voltage of the bias source. On the other hand, when the transistor 223 is in its conductive state, the crosspoints are enabled since the collector-emitter circuit of the transistor 223 then provides a path for current flow through the voltage dividers or voltage dropping resistors, as the case may be, in the respective gate biasing circuits for the crosspoints. Of course, the voltage dropping resistor 224** usually may be omitted if the gate biasing circuits of the TAD crosspoints include voltage dividers since its function is simply to maintain a minimum bias voltage on the gates of the crosspoints during the period that the crosspoints are enabled.

Preferably, the crosspoints are enabled for only a brief period following the application of an end marking signal to the inlet 51. To that end, there are two transistors 225 and 226 which have their collector-emitter circuits connected in parallel with the base-emitter junction of the transistor 223, and provision is made to maintain one or the other of the transistors 225 and 226 in conduction at all times, except for the brief period following the application of an end mark to the inlet 51. As a result, the current that is drawn through a resistor 227 is supplied to drive the transistors 223 into conduction only during the period that the transistors 225 and 226 are both in their non-conductive states. To bleed-off or drain any relatively low level leakage currents and the like which may tend to cause the transistor 223 to conduct at other times, a resistor 228 may be connected across its baseemitter junction.

More particularly, as shown, the second or output transistor 222 of the Darlington pair has its emitter returned to ground through a load resistor 229 and its collector-emitter circuit connected in parallel with a pair of resistors 231 and 232. The base of the transistors 225 is connected to the emitter of the transistor 222 by a current limiting resistor 233 and a diode 234. The base of the transistor 226, on the other hand, is connected by a current limiting resistor 236 to the collector of a transistor 237 which, in turn, has its emitter connected to the supply source and its base connected by a diode 238 to a point between the resistors 231 and 232.

In the absence of an end marking signal at the inlet 51, the transistors 221 and 222 are driven into hard conduction by the current drawn through the resistor 86 (FIGS. 1 and 4). Thus, there is a relatively large voltage developed across the load resistor 229 which causes the transistor 225 to be driven into conduction by current drawn through the resistor 233 and the diode 234. Consequently, the current drawn through the resistor 227 under those conditions is shunted to ground through the collector-emitter circuit of the transistor 225, and the transistor 233 is, therefore, held in its non-conductive state. At the same time, the voltage developed across the combination of the resistors 229 and 232 is sufficiently high to back bias the base-emitter junction of the transistor 237 and the anode-cathode junction of the diode 238. Accordingly, the transistor 237 is held in its non-conductive state to, in turn, hold the transistors 226 in its non-conductive state. Preferably, to bleed-off or drain the small leakage currents that may be present, respective resistors 239 and 241 are connected across the base-emitter junctions of the transistors 237 and 226.

On the other hand, when an end mark is applied to the inlet 51, there is a low impedance path to ground which diverts a substantial portion of the current drawn by the resistor 86. The transistors 221 and 222 therefore conduct less heavily, i.e., tend to switch to their nonconductive states, thereby causing the voltage developed across the resistor 229 to drop. As a result, the transistor 225 switches to its nonconductive state, so that the current drawn through the resistor 227 is then available to drive the transistor 223 into conduction. To ensure that the transistor 225 rapidly switches to its non-conductive state and then remains in that state so long as an end mark is applied to the inlet 51, a resistor 235 is connected across its base-emitter junction to quickly discharge its storage current and thereafter drain or bleed-off any leakage currents or the like that may be present.

The relative values of the resistors 229, 231 and 232 are selected so that the voltage developed across the resistors 229 and 231 decreases in response to the application of an end mark to the inlet 51 to a level sufficient to forward bias the base-emitter junction of the transistor 237 and the anode-cathode junction of the diode 238. Hence, after a brief delay during which the capacitances of both junctions are charged, the transistor 237 is switched into conduction and current, therefore, starts to flow through the resistor 236. However, to further delay the response of the transistor 226, the relative values of the resistors 236 and 241 are selected so that the transistor 226 is held in its non-conductive state until the transistor 237 is substantially in a state of saturated conduction. Once that occurs, the transistor 226 is switched into conduction, whereupon the current drawn through the resistor 227 is shunted to ground via the relatively low impedance of its collector-emitter circuit, and the transistor 223, therefore, reverts to its non-conductive state.

From the foregoing, it will be appreciated that the gate control circuit 217*a* is a pulse type control circuit in that it enables the associated crosspoints by causing the gate bias voltage therefor to drop to a relatively low level for a brief period in response to the application of an end mark to the associated inlet. The duration of the enabling pulse, i.e., the duration of the period during which the crosspoints are enabled, depends on the relative speeds of response of the transistors 225 and 226 to the application of an end mark to the associated inlet. Preferably, of course, the duration of the enabling pulse or period is selected to be long relative to the turn-on time for the TAD crosspoints, so as to assure that the appropriately end marked crosspoints switch into conduction, regardless of whether they exhibit rate sensitive switching or not. Moreover, to prevent potential false firing of the crosspoints, the response of the transistor 225 to the removal of the end mark from the inlet is preferably fast relative to the response of the transistor 226 so that the transistor 225 is switched into conduction before thr transistor 226 is switched out of conduction. There are, therefore, timing relationships which may require that the gate control circuit 217*a* be readjusted from time-to-time as its components age and as other variables, such as ambient temperature, change.

Turning next to FIG. 6, the gate control circuit 217*b* performs essentially the same function as the control circuit 217*a*, but requires only a single transistor 251. Again, the gate biasing circuits for the associated TAD crosspoints, say the crosspoints 61–63 (FIGS. 2 and 4), are completed through the collector-emitter circuit of the transistor 251 and provision is made to momentarily switch the transistor 251 into conduction in response to the application of an end mark to the inlet 51 so as to provide a gate pulse which enables the crosspoints for a brief period. However, to accomplish the desired result with the control circuit 217*b*, the base of the transistor 251 is connected by a resistor 253, a capacitor 254, and the lead 111 to the inlet 51, and its collector is returned to ground. The emitter of the transistor 251 is, in turn, connected by a load resistor 252 to a suitable supply source and by the lead 112 to the gate biasing circuits for the crosspoints.

Accordingly, in the absence of an end mark at the inlet 51, the transistor 251 is held in its non-conductive state, since its base-emitter junction is back biased by the relatively high voltage that is developed across the inlet. The crosspoints are, therefore, inhibited by having their gate bias voltages held at substantially the output voltage of the bias supply source.

On the other hand, when the inlet 51 is end marked, the voltage developed across it drops to a relatively low level such that the base-emitter junction of the transistor 251 becomes forward biased. Current is, therefore, drawn through the resistors 252 and 253 which, after charging the base-emitter junction capacitance, drives the transistor 251 into conduction. Consequently, the bias voltages for the TAD crosspoints drop to a relatively low or enabling level since the collector-emitter circuit of the transistor 251 then provides a low impedance path for current flow through the voltage dividers (FIG. 2) or voltage dropping resistors (FIG. 4), as the case may be, in the gate biasing circuits for the crosspoints.

The length of the period during which the TAD crosspoints are enabled, i.e., the duration of the gate pulse, depends on the charging time constant for the capacitor 254, since the transistor 251 gradually reverts to its non-conductive state as the capacitor 254 charges, with the result that the bias voltages for the gates of the unfired crosspoints gradually increase toward the level of the output voltage of the bias supply source. Accordingly, to adjust the charging time constant for the capacitor 254 so as to obtain a gate pulse of sufficient duration to effect rate independent switching of the appropriately end marked crosspoints, a resistor 255 is preferably connected between the supply source and the junction intermediate the resistor 253 and the capacitor 254.

When the end mark is removed from the inlet 51, the capacitor 254 discharges. The discharge current for the capacitor 254 develops a back bias for the base-emitter junction of the transistor 251 across the resistor 253, and the transistor is, therefore, reliably maintained in its non-conductive state. In this respect, the gate control circuit 217*b* is somewhat superior to the control circuit 217*a* 2 and 4, is illustrated in the same timing problems. Indeed, for limiting the amount of back bias applied to the base-emitter junction of the transistor 251 while the capacitor 254 discharges, there is preferably a diode 256 connected in parallel with the resistor 255. However, the gate control circuit 217*b* does not have the same high input impedance as the control circuit 217*a*, especially under the dynamic conditions which exist immediately after the application or removal of an end mark to or from the inlet 51. Further, it does not have the same degree of noise immunity.

A further alternative gate control circuit 217*c*, which is especially suitable for matrices such as shown in FIGS. AND $, IS ILLUSTRATED IN FIG. 13. This control circuit is particularly desirable for packaging with the TAD crosspoints in integrated circuit form because it provides a substantial space savings principally on account of the relatively few resistors it requires. Specifially, it will be seen that there is a single reference section 281 which supplies fixed reference voltages not only for the gate control circuit 217*c* but also for the other similar gate control circuits 218*c* and 219*c* (not shown) provided for the other rows of the matrix. Thus, while there is a respective gate control circuit 217*a*–217*c* for each of the several rows of the matrix, the control circuits 217*a*–217*c* do share a common reference section 281. This leads to the aforementioned space savings.

Referring in more detail to the gate control circuits 217*c* which, as shown, is assumed to be associated with the TAD crosspoints 61–63 comprised by the upper row of the matrix (FIGS. 2 and 4), it will be seen that the gate biasing circuits of the crosspoints 61–63 are completed through the collector-emitter circuit of a transistor 260. Under quiescent conditions the transistor 260 is held in its non-conductive state, with the result that the crosspoints 61–63 are inhibited by virtue of having their gates held at substantially the output voltage of the bias supply source. However, when an end mark is applied to the inlet 51 there is a brief delay and then the transistor 260 is momentarily switched into conduction to provide a gate pulse which enables the crosspoints 61–63 for a brief period. Conduction by the transistor 260 enables the associated crosspoints 61–63 because the collector-emitter circuit of the transistor 260 then provides a return path for current flow through the voltage dropping resistors (say, the resistors 151 and 152 of FIG. 4) in the respective gate biasing circuits for the crosspoints.

The gate control circuit 217*c* includes a multi-collector transistor 265 which is switched into and out of conduction under the control of a pair of transistors 261 and 262 in response to the application and removal of an end marking signal to and from the inlet 51. The emitters of the transistors 261 and 262 are joined and returned to ground through the collector-emitter of a transistor 263 and a series connected resistor 264. A fixed bias voltage is applied from the reference section 281 via the lead 280 to the base of the transistor 263, and the bias voltage is selected to forwardly bias the base-emitter junction of the transistor 263 so that the transistor 263 functions as constant current drain for the transistors 261 and 262. The bases of the transistors 261 and 262 are respectively coupled to the inlet 51 via the lead 111 and to the reference section 281 via a lead 275. Moreover, the collectors of the transistors 261 and 262 are connected in parallel to a suitable supply source, with the base-emitter junction and one of the collectors of the transistor 265 being disposed in series between the collector of the transistor 262 and the supply source.

In the absence of an end mark at the inlet 51, the voltage at the base of the transistor 261 is substantially higher than the fixed bias voltage applied to the base of the transistor 262. Thus, the transistor 261 conducts and provides substantially all of the collector-emitter current required by the transistor 263. Under those conditions, the base-emitter junction of the transistor 262 is back biased such that the transistor 262 is held in its non-conductive state to, in turn, hold the transistor 265 in its non-conductive state. When, however, an end mark is applied to the inlet 51, the voltage developed across the inlet drops to a relatively low level as previously explained, with the result that the voltage at the base of the transistor 261 drops below the bias voltage applied to the base of the transistor 262. Consequently, the transistor 262 switches into conduction as the transistor 261 switches out of conduction. Of course, when the transistor 262 switches into conduction, the multi-collector transistor 260 also switches into conduction because of the current drawn through its base-emitter junction to satisfy the current requirements of the transistor 263. As will be appreciated, because the collector-emitter circuit of the transistor 263 is connected in the return path to ground for the base-emitter junction of the transistor 261, there is a high a.c. impedance to preclude the gate control circuit 217*c* from imposing any appreciable a.c. load on the inlet 51.

To provide the desired timing whereby the gate control pulse to enable the TAD crosspoints 61–63 follows the application of an end mark to the inlet 51 after a slight delay, there is a transistor 266 which has its collector-emitter circuit connected to one of the collectors of the transistor 265 in parallel with the base-emitter circuit of the transistor 260 and its base-emitter circuit connected across a capacitor 268. The capacitor 268 is, in turn, connected to another of the collectors of the transistors 265 in parallel with the series combination comprising the collector-emitter circuit of a transistor 267 and an emitter resistor 274. The base of the transistor 267 is tied to the base of the transistor 263 such that its base-emitter junction is forwardly biased like that of the transistor 263 by the fixed bias voltage provided by the reference section 281 via the lead 280. Thus, the transistor 267 is at all times at least conditioned for conduction to thereby insure that the capacitor 268 is substantially discharged under quiescent conditions. The collector of the transistor 260 is tied to the gate bias circuits of the associated TAD crosspoints 61–63 via a series of transistors 269-273. The transistors 269–272 are configured to function as forwardly poled diodes, while the transistor 273 is configured to function as a Zener diode. Hence, when an end mark is applied to the inlet 51, the transistor 265 switches into conduction, thereby providing base-emitter drive current for the transistor 260 and charging current for the capacitor 268. After the junction capacitance of the transistor 260 has been charged, it switches into conduction, thereby causing the voltage at the gates of the crosspoints 61–63 to drop to a level determined by the Zener breakdown voltage of the transistor 272, together with the forward voltage drops of the base-emitter or diode junctions of the transistors 269–272 and the collector-emitter drop of the transistor 260. The drop in the gate bias voltages on the crosspoints thus defines the leading edge of the enabling pulse and follows the application of an end mark to the inlet 51 by a brief period. Also, because of the charging current provided for the capacitor 268, the voltage on the capacitor builds at a predetermined rate toward a level sufficient to forward bias the base-emitter junction of the transistor 266. Once that level is reached, the transistor 266 switches into conduction, thereby causing the transistor 260 to revert to its non-conductive state which, in turn, causes the voltage on the gates of the cross-points 61–63 to return to the relatively high inhibiting level, such that there is a trailing edge to terminate the enabling pulse after a brief period during which the crosspoints with appropiately end marked anodes are conditioned to switch into conduction. Finally, when the end mark is removed from the inlet 51, the capacitor 268 discharges through the collector-emitter circuit of the transistor 267, thereby returning the gate control circuit 217c to its quiescent state. As will be appreciated, the above described timing sequence is substantially constant since the base-emitter current drawn by the transistor 265 in response to an end mark at the inlet 51 does not significantly vary, with the result that the current drawn by its various collectors is generally constant. Preferably, the multi-collector transistor 265 is configured so that sufficient current is provided when it is in conduction to permit saturation of the transistors 266 and 267. Indeed, for the brief period of the gate enabling pulse, i.e., before the transistor 266 switches into conduction), there is desirably sufficient collector current from the transistor 265 to not only initiate charging of the capacitor 268 but to also drive the transistor 260 into saturation.

In keeping with the objective of minimizing the space required for the gate control circuitry in matrices embodied in integrated circuit form, the common reference section 281 merely comprises a pair of resistors 276 and 277 and a pair of transistors 278 and 279. The resistors 276 and 277 are connected in series between a suitable supply source and the collector of the transistor 279 which, in turn, has its emitter returned to ground and its base connected to the emitter of the transistor 278. The collector of the transistor 278 is connected directly to the supply source and its emitter is connected to the base of the transistor 279. Thus, the current drawn through the resistors 276 and 277 drives the transistor 278 into conduction which, in turn, drives the transistor 279 into conduction. As will be appreciated there is negative feedback from the transistor 279 to the transistor 278 which insures that the bias voltages provided by the reference section 281 are substantially constant. As shown, the bias voltage for the transistor 262 is picked off from the junction between the resistors 276 and 277 and is, therefore, primarily determined by the voltage dividing ratio of those resistors. The bias voltage for the transistors 263 and 267 is, on the other hand, picked off from the base of the transistor 279 such that is primarily determined by the voltage drop across the base-emitter junction of the transistor 279. Indeed, the bias voltage for the transistors 263 and 267 follows the slight variations in the drop across the emitter junction of the transistor 279 caused by temperature variations and the like and thereby tends to compensate for similar variations of the voltage drop across the base-emitter junction of the transistor 263 and 267.

As will be noted, the previously discussed gate control circuits 117, 217a, 217b and 217c control the gate bias voltage levels for the TAD crosspoints by controlling the series current flow through their respective gate biasing circuits. There are, however, other approaches that may be taken to accomplish substantially the same result. For instance, means may be provided to control the valve of the impedances between the bias supply source and the gates of the crosspoints, either along or in conjunction with control of the current flow through the gate biasing circuits for the crosspoints.

To illustrate the foregoing, reference is had to FIG. 7, wherein the upper arms or legs of the gate biasing voltage dividers 71, 73, 77 and 79 are shown as being connected in parallel with the collector-emitter circuit of respective transistors 301–304. Again, there are separate gate control circuits 305 and 306 which are respectively connected by leads 307 and 308 to the inlets 51 and 52 defined by the respective rows of the matrix. However, in this case, the control circuits 305 and 306 control the gate bias voltage levels for the crosspoints 61, 63 and 67, 69, respectively, not only by controlling the current flow through their gate biasing circuits, but also by controlling the amount of impedance interposed between their gates and the bias supply source. For that reason, the control circuit 305 is shown as being connected by a lead 309 and respective resistors 311 and 312 to the bases of the transistors 301 and 302 and by another lead 313 to the diodes 101 and 102 so as to control the gate bias voltages for the upper row of crosspoints 61 and 63. In a like manner, the control circuit 306 is shown as being connected by a lead 314 and respective resistors 315 and 316 to the bases of the transistors 303 and 304 and by another lead 317 to the diodes 107 and 109 so as to control the gate bias voltages for the lower row of crosspoints 67 and 69.

Figure 8:
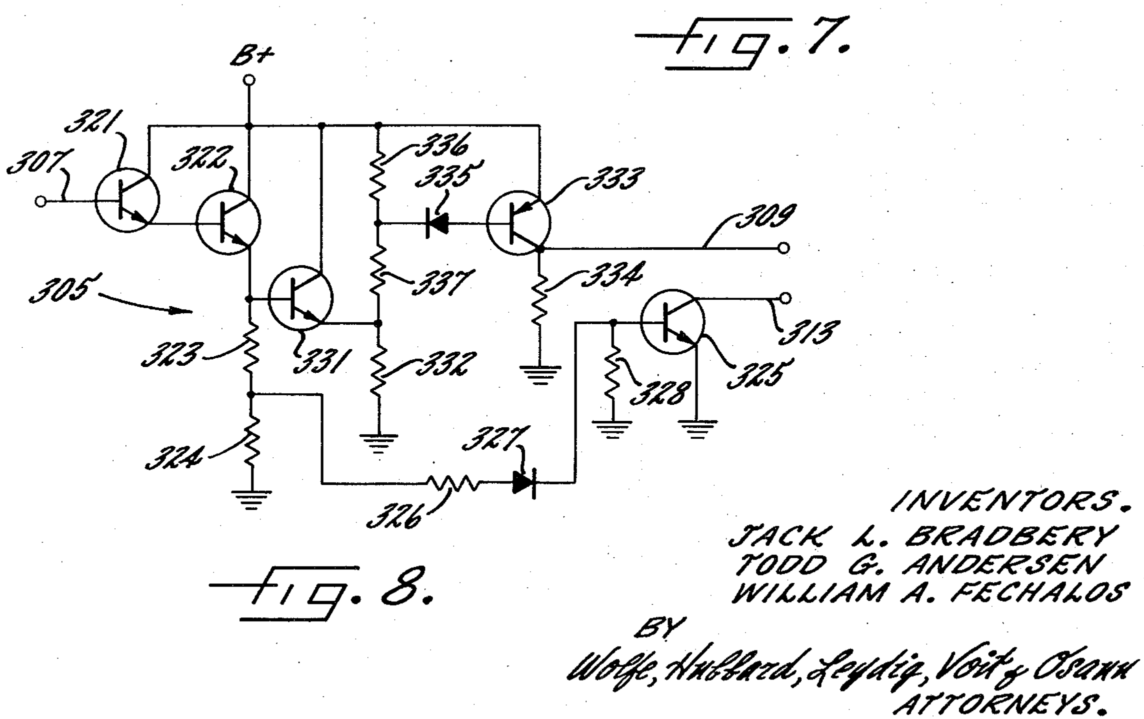
FIG. 8 is a schematic diagram of a gate control circuit which may be used with the matrix of FIG. 7 to provide substantially the same degree of control as is afforded by the gate control circuits shown in FIGS. 5 or 6 when used in combination with the matrices shown in FIGS. 2 or 4.

The gate control circuits 305 and 306 provide essentially the same control as is afforded by the previously discussed control circuits 217*a* and 217*b*. For example, as shown in FIG. 8, as the input stage of the gate control circuit 305 there is a first transistor 321 which has its base connected by the lead 307 to the inlet 51 and a second transistor 322 which has its emitter returned to ground through a pair of resistors 323 and 324. As will be appreciated, the transistors 321 and 322 comprise a Darlington pair in an emitter follower configuration such that the control circuit 305 is characterized by an extremely high input impedance which ensures that the loading of the matrix thereby is negligible.

In the absence of an end mark at the inlet 51, the transistors 321 and 322 are driven into heavy conduction by the current drawn through the resistor 88 (FIG. 7). As a result, sufficient voltage is developed across the resistor 324 to cause a transistor 325 to be driven into conduction by current drawn through a current limiting resistor 326 and diode 327 which lead from the junction between the resistors 323 and 324 to the base of the transistor 325. As will be seen, the gate biasing circuits for the crosspoints 61 and 63 are connected by the lead 313 to the collector of the transistor 325 which, in turn, has its emitter returned to ground. Thus, when the transistor 325 is in conduction, its collector-emitter circuit provides a low impedance return path for current flow through the gate biasing circuits for the respective crosspoints.

Nevertheless, the crosspoints 61 and 63 are inhibited in the absence of an end mark at the inlet 51 by having their gate bias voltages held at substantially the output voltage of the bias supply source. To that end, there is a transistor 331 which has its base connected to the emitter of the second or output transistor 322 of the Darlington pair, its emitter returned to ground through a load resistor 322; and its collector connected to the supply source. Further, there is a transistor 333 which has its collector connected to the lead 309 and returned to ground by a load resistor 334, its emitter connected to the supply source, and its base connected by a diode 335 to the junction between a pair of resistors 336 and 337 which, in turn, are connected across the collector-emitter circuit of the transistor 331.

Accordingly, in the absence of an end mark at the inlet 51, the transistor 331 is driven into conduction by current drawn through the Darlington pair 321 and 322. Thus, there is sufficient voltage developed across the resistors 332 and 337 to prevent forward biasing of the base-emitter junction of the transistor 333 and the anode-gate junction of the diode 335, with the result that the transistor 333 is held in its non-conductive state. Under those conditions, the transistors 301 and 302 are driven into conduction by current flow through the resistors 311, 312 and 334. The crosspoints 61 and 63 are, therefore, inhibited since their gates are clamped to substantially the output voltage of the bias supply source by the collector-emitter circuits of the transistors 301 and 302.

In response to the application of an end mark to the inlet 51, the transistors 321, 322 and 331 all conduct less heavily i.e., they tend to switch to their non-conductive states. As a result, the transistors 301 and 302 are first switched to their non-conductive states so as to enable the TAD crosspoints 61 and 63, and then the transistor 325 is switched to its nonconductive state to again inhibit the crosspoints. More particularly, a relatively slight drop in the voltage developed across the resistors 332 and 337 is sufficient to forward bias the base-emitter junction of the transistor 333 and the anode-cathode junction of the diode 335. Then, as soon as both junction capacitances are charged, the transistor 333 switches into conduction thereby causing the voltage developed across the resistor 334 to increase to a level sufficient to cause the transistors 301 and 302 to switch to their non-conductive states. As will be noted, the collector-emitter circuit of the transistor 333 provides a low impedance discharge path for the storage currents of the transistors 301 and 302. Hence, the transistors 301 and 302 switch to their non-conductive states to remove their clamping effects from the gates of the crosspoints 61 and 63 very rapidly once the transistor 333 switches to its conductive state. The transistor 325, on the other hand, has a slower response to the end marking of the inlet 51. This follows from the fact that a relatively large drop in the voltage developed across the resistor 324 is required before the transistor 325 tends to switch to its non-conductive state. Also, its storage current is discharged relatively slowly, since it is discharged through the relatively high impedance of a resistor 328 which is connected across the base-emitter junction of the transistor 325 to drain or bleed off any leakage currents or the like which may appear when the transistor is in its non-conductive state. Accordingly, it will be seen that the gate control circuit 305 provides a gate pulse to enable the TAD crosspoints 61 and 63 for a brief period following the application of an end mark to the inlet 51. Specifically, there is a brief period during which there is series current flow through gate biasing circuits of the crosspoints, together with sufficient impedance between their gates and the bias supply source to drop their gate bias voltages to an enabling level. The period expires, of course, at the time the transistor 325 switches to its non-conductive state, since any of the crosspoints that have not fired at that time have their gate bias voltages returned to substantially the output voltage of the bias supply source.

Preferably, to prevent potential false firing of the TAD crosspoints 61 and 63 at the time the end mark is removed from the inlet 51, provision is made to cause the transistors 301 and 302 to switch back into conduction prior to the time that the transistor 325 switches back into conduction. In the gate control circuit 305 this is accomplished by adjusting the values of the resistors comprised by the two voltage dividers 323, 324 and 332, 336 and 337. Care must be taken, however, since any adjustments that are made affect the relative response times of the transistors 301, 302 and 325 not only to the removal of an end mark, but also to its application.

Figure 9:
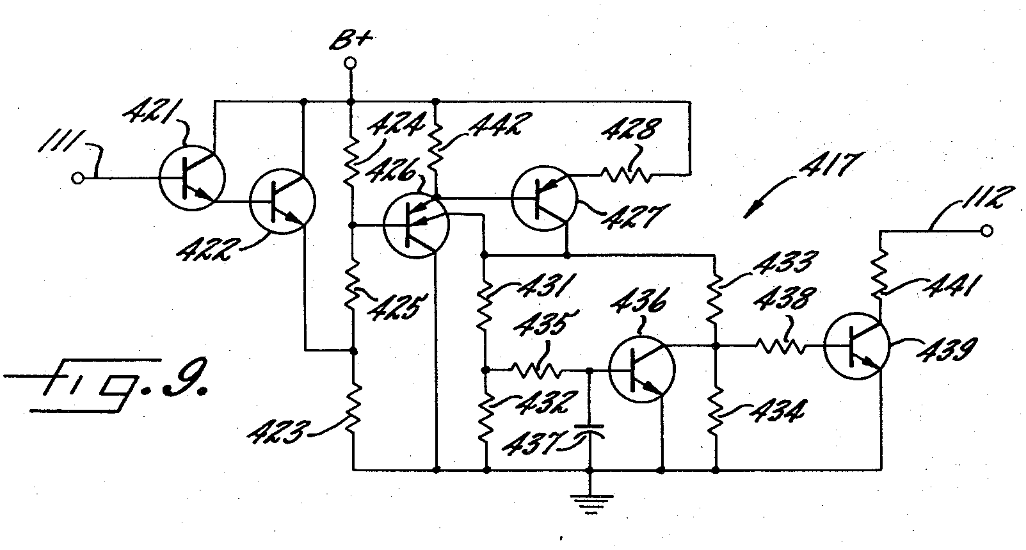
FIG. 9 is a schematic diagram of an even further improved gate control circuit for matrices such as shown in FIGS. 2 and 4.

Referring to FIG. 9, another gate control circuit which may be used to advantage in combination with switching systems embodying the present invention, such as the matrices shown in FIGS. 2 and 4, is indicated generally at 417. As compared with the gate control circuits that have been discussed hereinabove, the major improvement incorporated by the control circuit 417 is that it provides extremely reliable timing. It is noteworthy that as illustrated the gate control circuit 417 is uniquely a model of an integrated circuit since it includes a double emitter transistor 426. However, its discrete component counterpart will be apparent to those of ordinary skill in the art.

More particularly, in keeping with the objective of minimizing the loading caused by the gate control circuitry, the input stage of the control circuit 417 is again a Darlington pair 421 and 422 in an emitter-follower configuration. That is, the first transistor 421 of the Darlington pair is connected by the lead 111 to the inlet 51 and the second transistor 422 has its emitter returned to ground through a load resistor 423. As will be appreciated from the foregoing discussion of gate control circuits with similar input stages, the transistors 421 and 422 conduct relatively heavily in the absence of an end mark at the inlet 51 and tend to switch to their non-conductive states when an end mark is applied to the inlet.

To provide the desired control whereby the associated crosspoints, e.g., the TAD crosspoints 61–63 (FIGS. 2 or 4) are inhibited at all times except for a brief period following the application of an end mark to the inlet 51, there is an amplifier characterized by a high current gain which feeds the timing portion of the circuit. The amplifier comprises the double-emitter transistor 426 and another transistor 427. The transistor 426 has its base connected to a junction between a pair of resistors 424 and 425 which are connected across the collector-emitter circuit of the transistor 422, its collector returned to ground, its first emitter connected by a load resistor 422 to the supply source, and its second emitter connected to the collector of the transistor 427. The transistor 427, in turn, has its base connected to the first emitter of the transistor 426, its emitter connected by a resistor 428 to the supply source, and its collector returned to ground with the second emitter of the transistor 426 through a pair of parallel voltage dividers comprised by the resistors 431, 432 and 433, 434. A substantial degree of protection against false firing of the associated crosspoints in response to noise or the like is obtainable, since the values of the resistors 423-425 may be selected to provide noise immunity without adversely affecting the timing discussed hereinbelow. Preferably, therefore, their values are selected so that the transistors 426 and 427 switch into conduction only if the conductivity of the transistors 421 and 422 is decreased to the level characteristic of an end mark at the inlet 51.

For timing purposes, the junction between the resistors 431 and 432 is connected by a resistor 435 to the base of a transistor 436 which, in turn, has a capacitor 437 connected across its base-emitter circuit and its emitter returned to ground. As will be appreciated, the resistor 435 and the capacitor 437 form a RC-type delay circuit. The junction between the resistors 433 and 434, on the other hand, is connected by a resistor 438 to a transistor 439 which has its collector connected by a voltage dropping resistor 441 and the lead 112 to the gate biasing circuits for the crosspoints and its emitter returned to ground. Further, the junction between the resistors 433 and 434 is connected to the collector of the transistor 436 such that the collector-emitter circuit of the transistor 436 is connected in parallel with the base-emitter circuit of the transistor 439.

Hence, in the absence of an end mark at the inlet 51, the voltage developed across the resistors 423 and 425 maintains the transistor 426 in its non-conductive state. Accordingly, the other transistors 427, 436 and 439 are held in their non-conductive states. Hence, the associated TADs are inhibited since there is no path for current flow through their gate biasing circuits with the result that their gates are maintained at substantially the output voltage of the bias supply source.

However, when an end mark is applied to the inlet 51, the voltage developed across the resistors 423 and 425 drops to a characteristically low level. Hence, the transistor 426 is switched into conduction to, in turn, switch the transistor 427 into conduction. As will be seen, the collector-emitter voltage drop across the transistor 427 is limited by the transistor 426 to about one diode drop. Thus, the transistor 427 is prevented from going into saturated conduction, and the current losses to the substrate (not shown) of the integrated circuit are, therefore, minimized. At the time that the transistors 426 and 427 are switched into conduction, the voltages developed across the resistors 432 and 434 increase in a manner tending to switch the transistors 434 and 439, respectively, into their conductive states. Of course, the transistor 439 can conduct only if the transistor 436 remains in its non-conductive state. Once the transistor 436 is switched into conduction, its collector-emitter circuit reduces the impedance across the base-emitter junction of the transistor 439 to such a low level that further conduction by the transistor 439 is precluded. Thus to provide a gate pulse to enable the associated TAD crosspoints 61–63 for a brief period in response to the end marking of the inlet 51, the value of the resistors 431–434 and the charging time constant associated with the RC circuit 435, 437 are selected so that the transistor 436 switches into conduction after a predetermined period of conduction by the transistor 439 such that there is a brief period of current flow through the gate biasing circuits for the TAD crosspoints 61–63. Again, to ensure firing of the crosspoints 61-63 that are appropriately end marked, regardless of whether they exhibit rate sensitive firing or not, the crosspoints are preferably enabled for a period that is long relative to their characteristic turn-on time.

The gate control circuit 417 provides substantially fail-safe protection against false firing of the associated TAD crosspoints in response to the removal of the inlet end mark. Specifically, since the transistor 436 cannot revert to its non-conductive state until the capacitor 437 has substantially discharged, the "turn-off time" for the transistor 436 is long relative to the "turn-off time" for the transistors 426 and 427. The transistor 439 is, therefore, reliably held in its non-conductive state when the end mark is removed by virtue of the fact that the current that continues to flow through the resistor 433 until the transistors 426 and 427 revert to their non-conductive states is harmlessly diverted to ground through the low impedance path provided by the collector-emitter circuit of the transistor 436.

Figure 10:
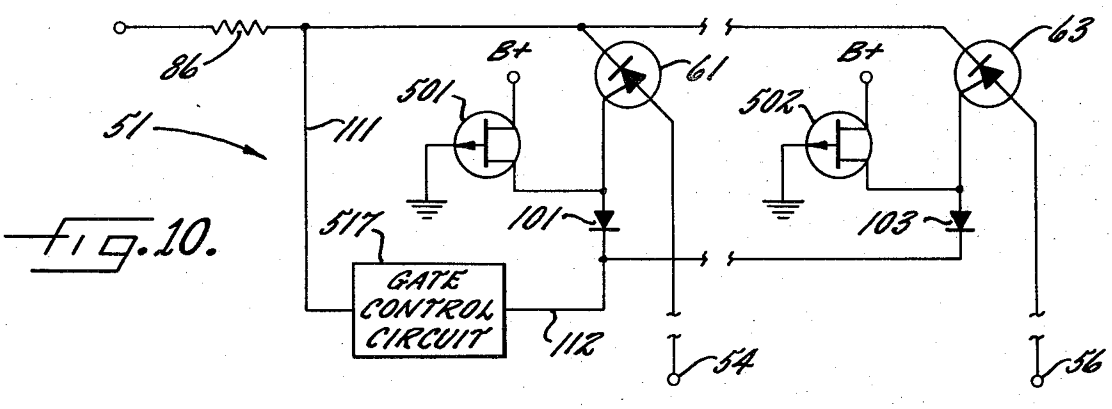
FIG. 10 illustrates a further modification of the gate biasing circuits for the TAD crosspoints of a matrix embodying the present invention.

As shown in FIG. 10, a further modification that may be made to the gate biasing circuits of the TAD crosspoints involves providing them with respective field effect transistors 501 and 502. The field effect transistors 501 and 502 are alternative to the voltage dividers (FIG. 2) or voltage dropping resistors (FIG. 4) and are, therefore, connected in a resistance configuration with the bases grounded and their source-drain circuits interposed between the bias supply source and the gates of the respective crosspoints. The primary advantage of this modification is that it reduces the space requirements for the integrated circuit version of the control circuitry. It is, however, more difficult to maintain reasonably close tolerances on the resistances presented by the source-drain circuits of field effect transistors and it is, therefore, desirable that provision be made for determining the enabling gate bias voltage levels for the crosspoints substantially independently of the specific resistance values of the source-drain circuits of the field effect transistors.

Figure 11:
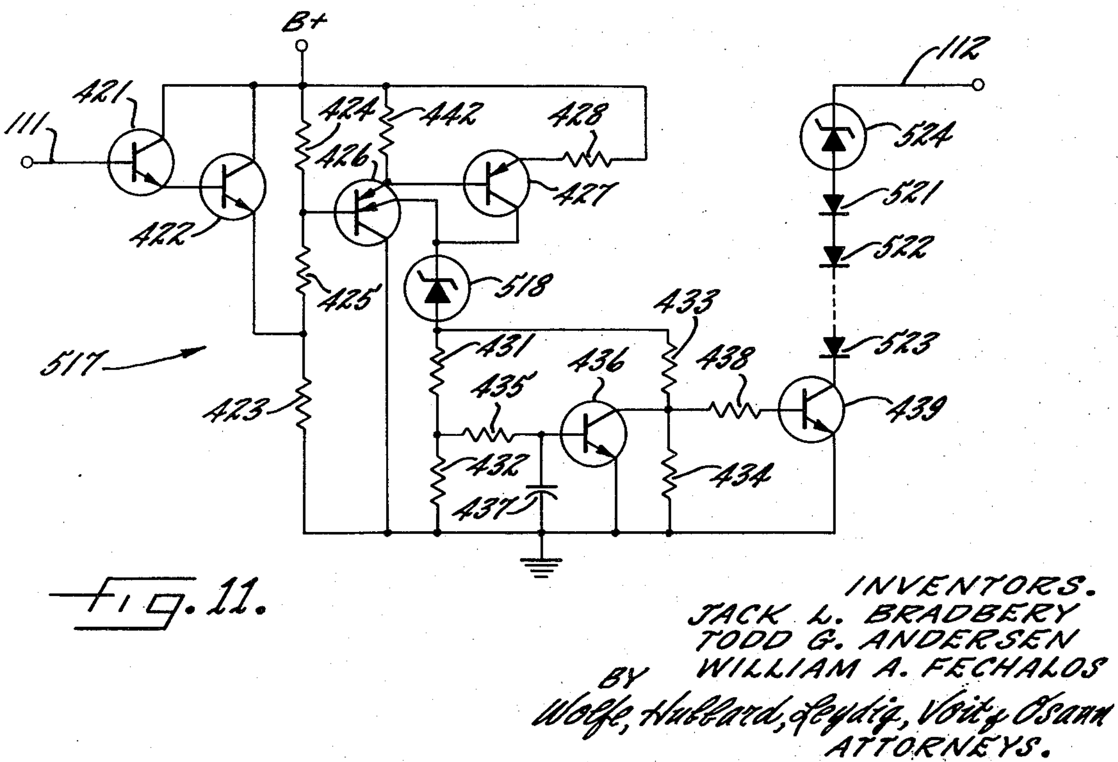
FIG. 11 is a schematic diagram of another gate control circuit and illustrates certain refinements that may be made to simplify the integration of the matrix and gate control circuitry.

Such provision may, for example, be made by slight revision of the gate control circuitry. To that end, FIG. 11 illustrates a gate control circuit 517 which will be recognized as being generally the same as the gate control circuit 417 of FIG. 9, with the major exception being that the voltage dropping resistor 441 has been replaced by a string of diodes 521–523. The forward voltage drops across the diodes 521–523 are, of course, substantially independent of the amount of current flow therethrough. Thus, variations in the resistances presented by the source-drain circuits of the field effect transistors 501 and 502 (FIG. 10) have substantially no effect on the voltage at which the gates of the TAD crosspoints are held while the transistor 439 is in its conductive state. As will be seen, an oppositely poled Zener diode 524 may be connected in series with the diodes 521–523 to reduce the number of diodes required to maintain the desired bias voltage on the gates of the crosspoints while they are enabled. Indeed, the Zener diode 524 may be used without the diode string 521–523 provided that it has a sufficiently high Zener or reverse breakdown potential. Of course, the field effect transistors 501 and 502 are only one example of semiconductive resistance devices that might be employed. Also, to further reduce the space required for integration of the control circuitry, another Zener diode 518 may be connected between the upper ends of the voltage dividers 431, 432 and 433, 434 and the connection of the collector of the transistor 427 to the second emitter of the transistor 426. As will be seen, the Zener diode 518 is poled to be reverse biased. Thus, by selection of the reverse or Zener breakdown potential for the Zener diode 518, the voltage developed across the voltage dividers 431, 432 and 433, 434 while the transistors 426 and 427 are in conduction may be reduced to permit a corresponding reduction in the physical sizes of the resistors comprised by the voltage dividers.

As previously mentioned, one of the advantageous features of the present invention is that the single stage matrices and their accompanying gate control circuitry may readily be reduced to integrated circuit form. No specific illustration of a typical chip or the like is believed to be necessary, since the integrated circuit form of the novel TAD thyristor is disclosed and claimed in the aforementioned U.S. Pat. No. 3,725,683 and the balance of the circuitry may be integrated therewith through the use of conventional techniques. It is noted, however, that the preferred integration is to include each single stage matrix together with the gate control circuits for its respective rows of TAD crosspoints in a single chip. The chip may be either a monolithic or thick film-type integrated circuit. Moreover, in the interest of space economy, the voltage dropping resistors at the inlets, say the resistors 86–88 (FIG. 2) are commonly discrete elements external to the integrated circuit, since their values are generally so large that it is not practical to integrate them with the balance of the circuitry.

Figure 12:
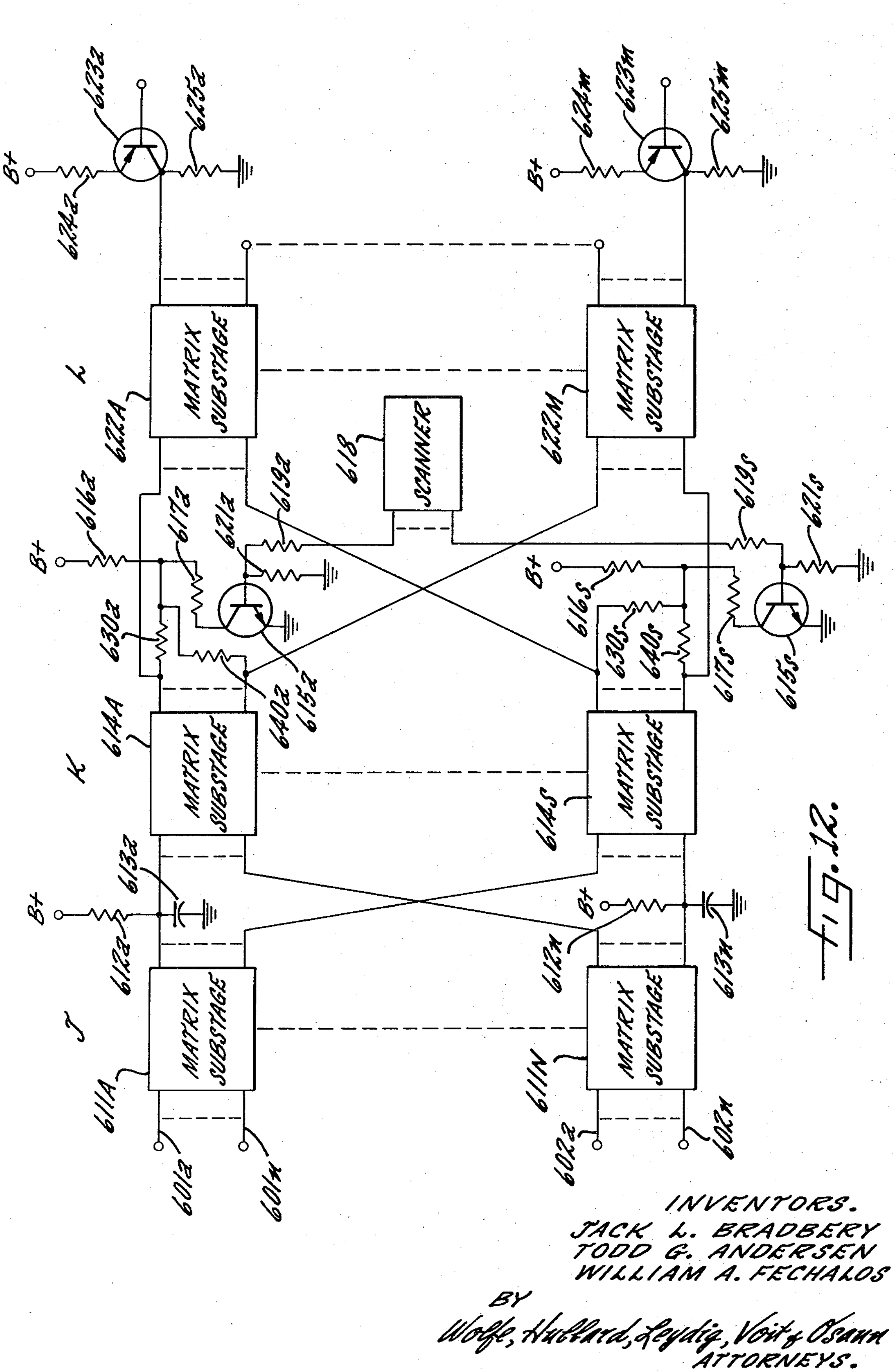
FIG. 12 is a simplified diagram of a three stage matrix and is representative of one of the various multi-stage matrix embodiments of the present invention.

Turning finally to FIG. 12, a three stage matrix has been diagrammatically illustrated to provide an example of one of the many multi-stage matrices which may embody the present invention. Each of the substages 611A–611N, 614A–614S and 622A–622M comprises a single stage matrix, such as shown in FIGS. 2, 4, 7 and 10, together with appropriate gate control circuitry, such as shown in FIGS. 3, 5, 6, 8, 9 or 11.

In the interest of clarity, FIG. 12 has been simplified by showing only the upper and lowermost substages of the J, K and L (or primary, secondary, and tertiary) stages of the matrix and by showing only the control circuitry associated with the upper and lowermost leads to and from the various matrix stages. It is to be understood, however, that each matrix stage may, and generally does, include additional substages. Furthermore, each lead to or from any given matrix stage is generally associated with identical control circuitry.

With that in mind, it will be seen that the leads between the outlets from the substages 611A–611N of the J-stage and the inlets to the substages 614A–614S of the K-stage are connected to a suitable supply source by respective voltage dropping resistors *612a–612n* and returned to ground by respective capacitors *613a–613n*. The capacitors *613a–613n*, therefore, tend to charge to the output voltage of the supply source which is selected to be substantially equal to the voltage required to appropriately end mark the anodes of the TAD crosspoints. Hence, the anodes of all the crosspoints in the J-stage of the matrix are initially end marked, such that an entire row of crosspoints momentarily switch into conduction in response to the end marking of the associated inlet to the J-stage. The values of the resistors *612a–612n* are, however, sufficiently large to limit the current drawn therethrough to a level well below the level of the holding current necessary to latch the crosspoints in their conductive states. Accordingly, after a predetermined period of conduction, the crosspoints revert to their nonconductive states, unless they are supplied with holding current via subsequent stages of the matrix.

In keeping with accepted practices, the outlets from each of the substages 611A–611N are connected to the inlets of different ones of the substages 614A–614S. Likewise, the outlets from each of the substages 614A–614S are connected to the inlets of different ones of the substages 622A–622M. Of course, if the matrix is expanded to include even further stages, the foregoing pattern is followed so that no two outlets of any substage are connected to inlets of the same substage of the following stage.

The outlets from the K-stage of the illustrated matrix are end marked on a sequential, stage-by-stage matrix so as to ensure that no more than one TAD crosspoint in the end marked row of the J-stage has a path for holding current. To that end, as shown, there are respective isolating resistors *630a–640a* through *630s–640s* which extend from the K-stage outlets and which are brought together substage-by-substage and connected to the midpoints of respective voltage dividers ***616a*, *617a–616s*, *617s*. The voltage dividers are connected between the supply source and the collectors of respective transistors *615a–615s* which, in turn, have their emitters returned to ground and their bases connected to separate outputs of a scanner 618 by respective current limiting resistors *619a–619s*. The values of the resistors *616a*, *617a–616s*, *617s* comprised by the respective voltage dividers are selected so that the voltages applied to the outlets of the substages 614A–614S while the transistors 615a–615s are in conduction are below the voltage required for appropriate end marking. The values of the isolating resistors 630a–640a and 630s–640s are, on the other hand, selected to be sufficiently large to effectively isolate the midpoints of the voltage dividers 616a, 617a–616s 617s from any busy or conductive paths within the K-stage. Thus, to end mark the K-stage outlets on a substage-by-substage basis, the transistors 615a–615s are sequentially pulsed out of conduction under the control of the scanner 618. Preferably, to drain or bleed-off any leakage currents that may appear while the transistors are in their non-conductive states, there are respective resistors 621a–621s** connected across their base-emitter junctions.

As will be appreciated, since the outlets of each of the substages within the J-stage are connected to the inlets of different substages of the K-stage which, in turn, have their outlets sequentially end marked on a substage-by-substage basis, only one crosspoint at a time of the end marked row or inlet of the J-stage has potential access to the L-stage. The values of the resistors 616a–616s, 630a–630s and 640a–640s are selected to limit the current drawn therethrough while the transistors 615a–615s are in their non-conductive states to a level below the holding current required by the TAD crosspoints. Thus, to maintain a path from an end marked inlet of the J-stage, holding current for the J and K stage crosspoints therein m must be supplied via the L-stage.

The holding current required to maintain a path from an end marked inlet of the J-stage to an end marked outlet of the L-stage is supplied from the end marked outlet of the L or final stage. For that reason, in the illustrated embodiment, the L-stage outlets are connected to the collectors of respective transistors 623a–623m which have their emitters connected to the supply source by respective resistors 624a–624m and their collectors returned to ground through respective load resistors 625a–625m. The values of the resistors 624a, 625a–625m, 625m are selected so that (1) sufficient voltage is developed across the load resistors 625a–625m when the transistors 623a–623m are switched into conduction to end mark their corresponding outlets from the L-stage and (2) sufficient current is drawn when an L-stage TAD crosspoint fires to latch the TAD crosspoints between the marked J-stage inlet and the marked L-stage outlet in their conductive states. Thus, it will be seen that a single and unambiguous path, comprising one crosspoint within each of the J, K and L stages, is maintained so long as the J-stage inlet and L-stage outlet end marks remain.

In summary, an example might be helpful. Assume for that purpose that the transistors 623a–623m are sequentially pulsed into conduction by a scanner 15 (FIG. 1) or the like to sequentially end mark the L-stage outlets. Further, assume that the inlet 602n to the J-stage is end marked in the time slot during which the uppermost outlet from the L-stage is end marked. The TAD crosspoints of the substage 611 N which are common to the inlet 602n all initially fire in response to the inlet end mark. Their anodecathode impedances, therefore, fall to such low levels that marks appear at an inlet of each of the substages 614A–614S comprised by the K-stage. The outlets to those substages are, in turn, sequentially marked substage-by-substage until one of them, say the substage 614A, is reached wherein the inlet end mark is applied to a row with one or more available TAD crosspoints. Those crosspoints then fire, thereby applying end marks to their corresponding inlets of the L-stage. If one of the last mentioned end marks is applied to an inlet of the substage 622A which has access to the end marked outlet thereof, the crosspoint connected therebetween fires and holding current is drawn such that the crosspoints in the J, K and L stages which complete a path from the end marked J-stage inlet to the end marked L-stage outlet are latched in their conductive states. Otherwise, the sequential end marking of the outlets from the substages 614A–614S continues in order to establish a path. In that connection, it is noted that the turn-off times for the TAD crosspoints of the J-stage are long relative to the turn-off times for the TAD crosspoints of the K-stage as a result of the discharge time constants associated with the capacitors 613a–613n. Thus, the crosspoints of the J-stage which fire in response to the end marking of an inlet thereof, but which are not included as a part of the path established between the marked J-stage inlet and the marked L-stage outlet, revert to their non-conductive states only after the path is established. On the other hand, the crosspoints of the K-stage that fire without becoming a part of the desired path, may relatively rapidly revert to their non-conductive states, since once fired the K-stage crosspoints need remain in their conductive states only long enough for firing of any L-stage crosspoint with access to the marked outlet from the L-stage.

Various possibilities will appear from the foregoing. Perhaps, the most notable of those is the economic feasibility of providing a non-blocking switching matrix which flows in large measure from the aforementioned compatibility of the single stage matrix, or matrix substage, of the present invention with packaging in integrated circuit form. The criteria for non-blocking matrices comprising various numbers of stages and substages are known and, therefore, need not be discussed herein. It should be noted, however, that even if a non-blocking matrix embodying the present invention is employed in a switching system, some blocking may still be present due to economic limitations on equipment peripheral to the matrix (e.g., the number of registers and links that may economically be included in a PAX such as shown in FIG. 1).

CONCLUSION

It will now be understood that the present invention provides a switching matrix which has a positive and unambiguous response in an end mark control mode. Rate effect switching of the crosspoints is not relied on to establish a path through the matrix, but can generally be tolerated. Instead, gate control circuitry is employed to establish a path through the matrix in response to the end marking of an inlet and outlet thereof and to, thereafter, lockout alternative or spurious paths to or from the end marked inlet and outlet so that there is at all times positive path control for the matrix. The matrix may be employed in single or multi-stage configuration for direct or indirect switching of signal information. Moreover, a single stage matrix, or each substage of a multi-stage matrix, may readily be packaged in integrated circuit form to thereby realize the attendant economies.

We claim as our invention:

1. A switching system controlled by applying and removing respective electrical end marking signals to and from an inlet and an outlet thereof, said system comprising the combination of a three terminal switching means having first and second terminals coupled between said inlet and said outlet, bias means coupled to a third terminal of said switching means for applying a bias thereto, and control means coupled between said first terminal and said bias means and responsive to the application of one of said end marking signals for controlling the bias applied to said third terminal by said bias means in accordance with a predetermined timing sequence so that said bias is changed a short time after the application of said end marking signal from a first level selected to enable said switching means to a second level selected to inhibit said switching means, whereby said switching means responds to the application of said end marking signals to said inlet and outlet only if said signals satisfy the predetermined timing relationship.

2. The switching system of claim 1 further including means for applying information bearing signals to said inlet for transmission between said inlet and outlet through said switching means when said switching means is in a conductive state.

3. The switching system of claim 2 wherein said switching means is switched to said conductive state when end marking signals which satisfy said predetermined timing relationship are applied to said inlet and said outlet.

4. The switching system of claim 1 wherein said bias means includes a bias supply source and impedance means coupled between said source and said third terminal of said switching means, and said control means includes switch means coupled to said impedance means and means coupled between said first terminal and said switch means for switching said switch means from one state to another so as to inhibit said switching means in response to but with a slight delay following the application of said one end marking signal.

5. The switching system of claim 4 wherein said switch means is coupled in series with said impedance means for controlling the flow of current therethrough, and said switch means is switched from a conductive state to a non-conductive state to inhibit said switching means.

6. The switching system of claim 4 wherein said switch means is coupled in parallel with said impedance means for controlling the amount of voltage dropped thereacross, and said switch means is swithced from a non-conductive state to a conductive state to inhibit said switching means.

7. The switching system of claim 1 wherein said causes means cuases said bias means to maintain the bias applied to the third terminal of said switching means at substantially said second level at all times except for a brief period following the application of said one end marking signal, whereby said switching means is enabled to respond to said end marking signals only for said brief period.

8. The switching system of claim 7 wherein said period is long relative to the time required for said switching means to respond to said end marking signals, whereby said switching means responds when said end marking signals are present during said period independently of any rate effect switching characteristics said switching means may possess.

9. An end mark controlled switching system comprising the combination of a three terminal, four layer thyristor having an anode, a cathode, and a gate brought out from the layer adjacent said anode so that there is an anode-gate junction defined therebetween; bias means coupled to said gate for applying a bias voltage thereto; end marking means coupled to said anode and cathode for marking said anode by applying a predetermined voltage thereto and for marking said cathode by completing a low impedance return path to ground therefrom; and control means coupled between said bias means and the cathode of said thyristor and responsive to the marking of said cathode for inhibiting said thyristor in accordance with a predetermined timing sequence by increasing the bias voltage applied to said gate a short time after the marking of said cathode to a level sufficient to preclude said anode-gate junction from being forward biased by the application of said anode end mark, whereby said thyristor switches into conduction in response to the marking of its anode and cathode only if said end marks satisfy the predetermined timing relationship.

10. The switching system of claim 9 wherein the anode and cathode of said thyristor are connected between an inlet and an outlet, and wherein said inlet includes means for applying information bearing signals which are transmitted to said outlet through the anode-cathode circuit of said thyristor when said thyristor is in its conductive state.

11. The switching system of claim 9 wherein the anode and cathode of said thyristor are connected between an inlet and an outlet, and wherein the anode-cathode circuit of said thyristor completes at least a voice grade transmission path between said inlet and said outlet when said thyristor is in its conductive state.

12. The switching system of claim 11 wherein said inlet includes means for applying analog signals for transmission to said outlet through the anode-cathode circuit of said thyristor when said thyristor is in its conductive state.

13. The switching system of claim 9 wherein said thyristor and said control means are included in a single integrated circuit.

14. The switching system of claim 9 wherein said bias means includes a bias supply source selected to have an output voltage which is high relative to the voltage of said anode end mark, and an impedance means coupled between said bias supply source and the gate of said thyristor; and said control means includes switch means coupled to said impedance means for controlling the amount of voltage dropped thereacross, and input means coupled between the cathode of said thyristor and said switch means for switching said switch means from one state to another in response to but with a slight delay following the marking of said cathode, whereby said thyristor is thereafter inhibited by having its gate bias voltage held at substantially the output voltage of said bias supply source at least until said cathode end mark is removed.

15. The switching system of claim 14 wherein the bias voltage applied to the gate of said thyristor is held by said control means at substantially the output voltage of said bias supply source at all times except for a brief period following the end marking of said cathode during which said bias voltage is reduced to a level which is sufficiently below the voltage of said anode end mark that the anode-cathode junction of said thyristor is forward biased to cause said thyristor to switch to its conductive state if an anode end mark is present during said period.

16. The switching system of claim 15 wherein said period is long relative to a predetermined turn-on time for said thyristor, whereby said thyristor switches into conduction if its anode is end marked at the time its cathode is end marked independently of the rate of change of its anode-cathode voltage.

17. The switching system of claim 15 wherein said switch means includes a transistor which has a collector-emitter circuit which is connected in series with said impedance means and a base coupled to said input means, said input means holding said transistor in a non-conductive state to thereby prevent current flow through said impedance means at all times except for said brief period following the end marking of the cathode of said thyristor, whereby the bias voltage applied to the gate of said thyristor is held at substantially the output voltage of said bias supply source at all times except for said brief period.

18. The switching system of claim 17 wherein said thyristor, said impedance means, and said transistor are included in the same integrated circuit.

19. The switching system of claim 17 wherein said impedance means comprises a field effect transistor having a sourcedrain circuit connected between said bias supply source and the gate of said thyristor and a grounded base, and said control means further includes means connected between the gate of said thyristor and the collector-emitter circuit of said transistor for maintaining a predetermined bias voltage on the gate of said thyristor when the last mentioned transistor is in its conductive state.

20. The switching system of claim 19 wherein said thyristor, said field effect transistor, said last mentioned transistor, and the means connected between the gate of said thyristor and the collector-emitter circuit of said last mentioned transistor are included in the same integrated circuit.

21. The switching system of claim 17 wherein said input means includes second and third transistors having parallel collectoremitter circuits connected to said bias supply source with the base of the second transistor connected to the cathode of said thyristor and the base of the third transistor connected to a fixed reference voltage means so that the second transistor is conductive and the third transistor is non-conductive when the voltage on the thyristor cathode is above said fixed reference voltage, and the second transistor is non-conductive and the third transistor is conductive when the voltage on the thyristor cathode is below said fixed reference voltage, and means responsive to conduction of said third transistor for reducing the first transistor conductive when the voltage on the thyristor cathode is below said fixed reference voltage.

22. The switching system of claim 21 wherein said means for rendering the first transistor conductive includes a fourth transistor having a collector-emitter circuit connected to the base of said first transistor and a base connected to the collector-emitter circuit of said third transistor for rendering said fourth and first transistors conductive in response to conduction of said third transistor.

23. The switching system of claim 21 which includes means for rendering said first transistor nonconductive at the end of said brief period following the end marking of the cathode of said thyristor regardless of whether said third transistor is conductive at the end of said brief period.

24. The switching system of claim 23 wherein said means for rendering said first transistor nonconductive includes a fifth transistor having a collector-emitter circuit connected between the base and the collector-emitter circuit of said first transistor and a base connected to the collector-emitter circuit of said fourth transistor, whereby conduction of said fifth transistor renders said first transistor non-conductive, and a capacitor connected to the base of the fifth transistor for delaying the conduction of said fifth transistor until said capacitor accumulates a predetermined charge in response to the conduction of said fourth transistor.

25. The switching system of claim 24 which includes a sixth transistor having a collector-emitter circuit connected to said capacitor and a base connected to a fixed reference voltage means for discharging said capacitor whenever said fourth transistor is non-conductive.

26. The switching system of claim 21 wherein said fixed reference voltage means includes circuit means connected to said bias supply source for furnishing said fixed reference voltage to a plurality of said input means coupled to a plurality of rows of thyristors.

27. The switching system of claim 25 wherein the fixed reference voltage means connected to said sixth transistor and the fixed reference voltage means connected to said third transistor comprise a single circuit means connected to said bias supply source for furnishing fixed reference voltages of two different values to a plurality of said input means coupled to a plurality of rows of thyristors.

28. The switching system of claim 21 wherein said thyristor, said impedance means, and said transistors are all included in the same integrated circuit.

29. The switching system of claim 14 wherein said input means is coupled to the cathode of said thyristor by a Darlington pair in an emitter follower configuration, whereby the loading of said thyristor by said control means is negligible.

30. The switching system of claim 14 wherein said switch means includes a first transistor having a collector-emitter circuit connected in parallel with said impedance means and a base and a second transistor having a collector-emitter circuit connected in series with said impedance means and a base; and wherein said input means is coupled to the bases of said first and second transistors and responds to the end marking of said cathode to hold said first and second transistors in non-conductive and conductive states, respectively, for a brief period following the cathode end marking.

31. An end mark controlled switching matrix comprising the combination of a plurality of three terminal, four layer thyristors each having an anode, a cathode, and a gate brought out from the layer adjacent said anode so as to be separated therefrom by an anode-gate junction, said thyristors being connected in rows and columns as crosspoints between inlets and outlets of said matrix with each row including a group of thyristors which have their cathodes connected in common and their anodes separately connected and each column including another group of thyristors which have their anodes connected in common and their cathodes separately connected; means for end marking the anodes of the thyristors in each column by applying a predetermined voltage thereto and for end marking the cathodes of the thyristors in each row by completing a low impedance return path to ground therefrom; a respective bias means coupled to the gate of each of said thyristors and isolated from the gate of each of said other thyristors for applying a bias voltage thereto which is independent of the bias voltage applied to the gates of the other thryistors; and respective control means for the thyristors of each row; each of said control means being connected between the common cathodes and the gate bias means of the thyristors in a respective one of said rows and being responsive to the marking of said cathodes to inhibit any of the thyristors in said row that are in a non-conductive state when a predetermined period has been elapsed following the end marking of said cathodes.

32. The switching matrix of claim 31 further including means for applying information bearing signals to the inlets of said matrix for transmission to selected outlets thereof via the anode-cathode circuits of said thyristors.

33. The switching matrix of claim 32 wherein said information bearing signals are analog signals, and the anode-cathode circuits of said thyristors provide at least voice grade transmission paths when said thyristors are in their conductive states.

34. The switching matrix of claim 31 wherein each of said control means inhibits the non-conductive thyristors in its respective row of the matrix by increasing the bias voltages applied to their gates to such a high level that their anode-gate junctions are prevented from being forward biased even if their anodes are later end marked.

35. The switching matrix of claim 31 wherein each of sad control means inhibits the non-conductive thyristors in its respective row of the matrix from switching to their conductive states at all times except for a brief period following the application of an end mark to their common cathodes.

36. The switching matrix of claim 31 wherein each of said bias means includes an impedance means connected between a bias supply source and the gate of the respective thyristor, and said bias supply source is selected to have an output voltage which is high relative to the voltage of said anode end mark, and wherein each of said control means includes means for maintaining the bias voltages applied to the gates of the non-conductive ones of its respective thyristors at substantially the output voltage of said bias supply source at all times except for a brief period following the end marking of their cathodes.

37. The switching matrix of claim 36 wherein said period is long relative to a predetermined turn-on time of said thyristors whereby any of said thyristors that have their anodes marked at the time their cathodes are marked switch into conduction regardless of the rate of change of their anode-cathode voltage.

38. The switching matrix of claim 37 wherein said thyristors, said impedance means, and said control means are included in the same integrated circuit.

39. The switching matrix of claim 31 wherein each of said control means includes a transistor which has a collector-emitter circuit connected in common to the bias means for its respective row of thyristors, and an input means coupled between the common cathodes of its row of thyristors and the base of said transistor for switching said transistor from a conductive state to a non-conductive state when said predetermined period elapses.

40. The switching matrix of claim 39 wherein the input means for each of said control means includes a Darlington pair in an emitter follower configuration whereby the loading of said matrix by sad control means is negligible.

41. The switching matrix of claim 39 wherein said bias means includes respective impedances connected between the gates of said thyristors and a bias supply source which is selected to have an output voltage which is high relative to the voltage of said anode end mark, and wherein each of said control means includes input means which maintain said transistor in a non-conductive state at all times except for a predetermined period following the application of a mark to the common cathodes of its respective row of thyristors, whereby the non-conductive thyristors of each row are inhibited from switching into conduction by having their gates held at substantially the output voltage of said bias supply source all times except for said predetermined period.

42. The switching matrix of claim 41 wherein said impedances comprise respective field effect transistors having source drain circuits connected between said bias supply source and the gates of the respective thyristors and grounded bases, and wherein each of said control means further includes means connected in series with the collector-emitter circuit of the transistor therein for determining the bias voltage applied to the gates of the thyristors in its respective row of the matrix when the last mentioned transistor is in its conductive state.

43. The switching matrix of claim 42 wherein the input means of each of said control means includes a Darlington pair in an emitter follower configuration, whereby the loading of said matrix by said control means is negligible.

44. The switching matrix of claim 43 wherein said thyristors, said field effect transistors, and said control means are all included in the same integrated circuit.

45. An end mark controlled switching matrix comprising the combination of a plurality of three terminal, four layer thyristors each having an anode, a cathode, and a gate brought out from the layer adjacent said anode so as to be separated therefrom by an anode-gate junction, said thyristors being connected in rows and columns as crosspoints between inlets and outlets of said matrix with each row including a group of thyristors which have their cathodes connected in common and their anodes separately connected and each column including another group of thyristors which have their anodes connected in common and their cathodes separately connected; means for end marking the anodes of the thyristors in each column by applying a predetermined voltage thereto and for end marking the cathodes of the thyristors in each row by completing a low impedance return path to ground therefrom; a respective bias means coupled to the gate of each of said thyristors and isolated from the gate of each of said other thyristors for applying a bias voltage thereto which is independent of the bias voltage applied to the gates of the other thyristors, said bias means includes respective impedances connected between the gates of said thyristors and a bias supply source which is selected to have an output voltage which is high relative to the voltage of said anode end mark; and respective control means for the thyristors of each row, each of said control means includes a transistor which has a collector-emitter circuit connected in common to the gate bias means for its respective row of thyristors, and an input means coupled between the common cathodes of its row of thyristors and the base of said transistor for switching said transistor from a conductive state to a non-conductive state when a predetermined period has elapsed following the end marking of said cathodes and for maintaining said transistor in a non-conductive state at all times except for the said predetermined period following the application of a mark to the common cathodes of its respective row of thyristors, said input means including second and third transistors having parallel collector-emitter circuits connected to said bias supply source with the base of the second transistor connected to the common cathodes of the respective row of thyristors and the base of the third transistor connected to a fixed reference voltage means so that the second transistor is conductive and the third transistor is non-conductive when the voltage on said thyristor cathodes is above said fixed reference voltage, and the second transistor is non-conductive and the third transistor is conductive when the voltage on said thyristor cathodes is below said fixed reference voltage, and means responsive to conduction of said third transistor for rendering the first transistor conductive when the voltage on said thyristor cathodes is below said fixed reference voltage, whereby said control means are effective to inhibit the non-conductive thyristors of each row from switching into conduction by having their gates held at substantially the output voltage of said bias supply source at all times except for said predetermined period.

46. The switching matrix of claim 45 wherein said means for rendering the first transistor conductive includes a fourth transistor having a collector-emitter circuit connected to the base of said first transistor and a base connected to the collector-emitter circuit of said third transistor for rendering said fourth and first transistors conductors in response to conduction of said third transistor.

47. The switching matrix of claim 45 which includes means for rendering said first transistor nonconductive at the end of said brief period following the end marking of the cathodes of said thyristors regardless of whether said third transistor is conductive at the end of said brief period.

48. The switching matrix of claim 47 wherein said means for rendering said first transistor nonconductive includes a fifth transistor having a collector-emitter circuit connected between the base and the collector-emitter circuit of said first transistor and a base connected to the collector-emitter circuit of said fourth transistor, whereby conduction of said fifth transistor renders said first transistor non-conductive, and a capacitor connected to the base of said fifth transistor for delaying the conduction of said fifth transistor until said capacitor accumulates a predetermined charge in response to the conduction of said fourth-transistor.

49. The switching matrix of claim 48 which includes a sixth transistor having a collector-emitter circuit connected to said capacitor and a base connected to a fixed reference voltage means for discharging said capacitor whenever said fourth transistor is non-conductive.

50. The switching matrix of claim 45 wherein said fixed reference voltage means includes circuit means connected to said bias supply source for furnishing said fixed reference voltage to a plurality of said input means coupled to a plurality of rows of thyristors in said matrix.

51. The switching matrix of claim 48 wherein the fixed reference voltage means connected to said sixth transistor and the fixed reference voltage means connected to said third transistor comprise a single circuit means connected to said bias supply source for furnishing fixed reference voltages of two different values to a plurality of said input means coupled to a plurality of rows of thyristors in said matrix.

52. The switching matrix of claim 45 wherein said thyristors, said impedance means, and said control means are all included in the same integrated circuit.

* * * * *